US011211755B2

(12) United States Patent
Miller et al.

(10) Patent No.: US 11,211,755 B2
(45) Date of Patent: Dec. 28, 2021

(54) POWER RAIL SYSTEM

(71) Applicant: POPPIN, INC., New York, NY (US)

(72) Inventors: Jeffrey F. Miller, New York, NY (US);
Matteo Bonacina, Astoria, NY (US);
Adrian Gomez, Edgewater, NJ (US);
Justin D. Dollinger, New York, NY (US); Robert D. Peavey, Brooklyn, NY (US)

(73) Assignee: Poppin Inc., New York, NY (US)

( * ) Notice: Subject to any disclaimer, the term of this patent is extended or adjusted under 35 U.S.C. 154(b) by 0 days.

(21) Appl. No.: 17/286,648

(22) PCT Filed: Oct. 25, 2019

(86) PCT No.: PCT/US2019/058035
§ 371 (c)(1),
(2) Date: Apr. 19, 2021

(87) PCT Pub. No.: WO2020/086949
PCT Pub. Date: Apr. 30, 2020

(65) Prior Publication Data
US 2021/0313749 A1    Oct. 7, 2021

Related U.S. Application Data

(60) Provisional application No. 62/751,136, filed on Oct. 26, 2018.

(51) Int. Cl.
*H02B 1/20* (2006.01)
*H01R 25/16* (2006.01)
*E04B 2/74* (2006.01)

(52) U.S. Cl.
CPC ......... *H01R 25/162* (2013.01); *E04B 2/7405* (2013.01); *E04B 2002/7488* (2013.01)

(58) Field of Classification Search
CPC ........ H01R 25/162; H01R 25/14; H01R 9/22; H01R 9/24; H01R 25/00; H01R 25/16;
(Continued)

(56) References Cited

U.S. PATENT DOCUMENTS 4,278,834 A * 7/1981 Boundy ................. H02G 3/288
174/496
4,646,211 A    2/1987 Gallant et al.
(Continued)

FOREIGN PATENT DOCUMENTS

WO     9305551 A2    3/1993
WO     2009052656 A1    4/2009
WO     2020086949 A1    4/2020

OTHER PUBLICATIONS

International Search Report and Written Opinion for International PCT Application No. PCT/US2019/058035, dated Jan. 6, 2020.
(Continued)

*Primary Examiner* — Angel R Estrada
(74) *Attorney, Agent, or Firm* — K&L Gates LLP

(57) ABSTRACT

A power rail system including a rail assembly, which includes a sidewall, a first interior compartment at least partially enclosed by the sidewall, the first interior compartment extending longitudinally along the first rail assembly, an opening in communication with the first interior compartment, the opening positioned along the sidewall, and a second interior compartment at least partially enclosed by the sidewall, the second interior compartment extending longitudinally along the first rail assembly and configured to receive the connector member therein. The power rail system can further include an electrical outlet assembly positionable within the first interior compartment. Further, various accessories, such as privacy screens, can be supported by the rail assembly. Still further, multiple rail assemblies
(Continued)

can be connected together to customize the size and/or configuration of the power rail system.

11 Claims, 19 Drawing Sheets

(58) Field of Classification Search
CPC .. H01R 25/145; H01R 25/161; H01R 25/142; E04B 2/7405; E04B 2002/7488; H02B 1/20; H02B 1/21; H02G 3/06; H02G 3/12; H02G 3/0608; H02G 3/00; H02G 3/0431; H02G 3/0437
USPC ..... 174/480, 481, 495, 496, 505, 68.1, 68.3; 361/600, 624, 637, 679.01; 439/110, 121, 439/212, 214, 544; 160/127, 129; 52/220.1, 220.3, 220.7, 220.8
See application file for complete search history.

(56) References Cited

U.S. PATENT DOCUMENTS

| | | | | |
|---|---|---|---|---|
| 5,112,240 A | * | 5/1992 | Nienhuis | E04B 2/7438 439/211 |
| 5,209,035 A | | 5/1993 | Hodges et al. | |
| 5,244,401 A | * | 9/1993 | Russell | A47B 97/00 174/500 |
| 5,357,055 A | * | 10/1994 | Sireci | H02G 3/288 174/497 |
| 5,511,349 A | * | 4/1996 | Kelley | H02G 3/0418 248/49 |
| 5,899,035 A | * | 5/1999 | Waalkes | E04B 2/7433 52/239 |
| 5,913,787 A | * | 6/1999 | Edwards | H02G 3/18 52/220.7 |
| 6,003,273 A | | 12/1999 | Elsholz et al. | |
| 6,408,579 B1 | | 6/2002 | Anderson et al. | |
| 6,575,777 B2 | * | 6/2003 | Henriott | H01R 25/162 439/215 |
| 6,865,853 B2 | * | 3/2005 | Burken | E04B 2/7422 160/135 |
| 7,658,002 B2 | * | 2/2010 | Riner | H01R 25/162 29/883 |
| 7,926,231 B2 | | 4/2011 | Laukhuf | |
| 2014/0106610 A1 | | 4/2014 | Byrne et al. | |

OTHER PUBLICATIONS

International Preliminary Report on Patentability for International PCT Application No. PCT/US2019/058035, dated Dec. 28, 2020.

* cited by examiner

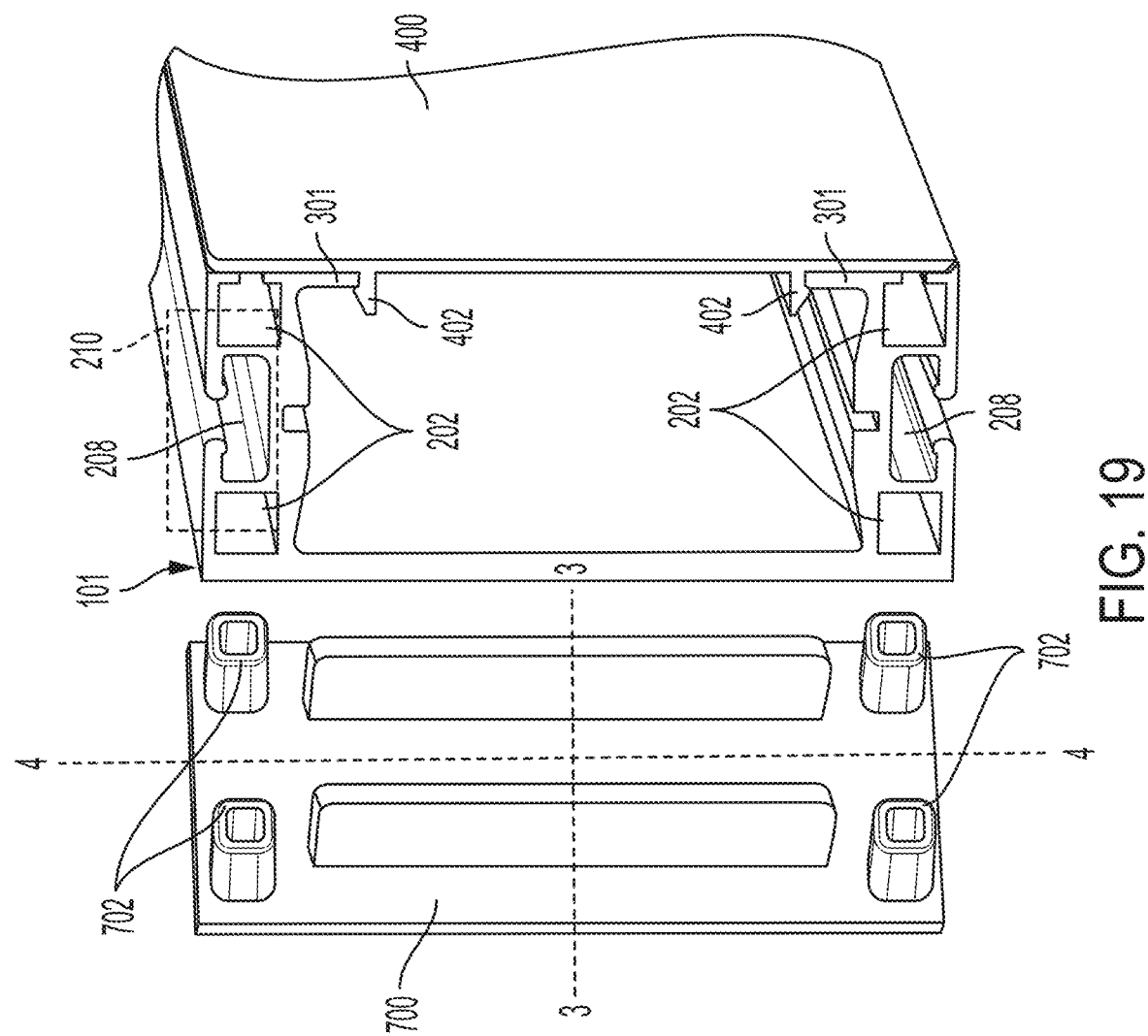

POWER RAIL SYSTEM

CROSS-REFERENCE TO RELATED APPLICATIONS

This application is a U.S. National Stage Entry under 35 U.S.C. § 371 of International Patent Application No. PCT/US2019/058035, filed Oct. 25, 2019 entitled POWER RAIL SYSTEM, which claims benefit under 35 U.S.C. § 119 (e) to U.S. Provisional Patent Application No. 62/751,136, entitled POWERED RAIL SYSTEM, filed Oct. 26, 2018, the entire disclosures of which are hereby incorporated by reference herein.

BACKGROUND

The present disclosure is related to a power rail system for use with desks and other office equipment. The power rail system is configured to provide access to electrical outlets within a working environment in a flexible, organized, and freely positionable manner, allowing users to freely configure their working environment floorplan as desired, without being restricted based upon the locations of the buildings' electrical outlets, through placement of the power rail systems.

SUMMARY

In one general aspect, a power rail system comprising a rail assembly and an electrical outlet assembly. The rail assembly is configured to be connected to a second rail assembly by a connector member. The first assembly comprises a sidewall; a first interior compartment at least partially enclosed by the sidewall, the first interior compartment extending longitudinally along the first rail assembly; an opening in communication with the first interior compartment, the opening positioned along the sidewall; and a second interior compartment at least partially enclosed by the sidewall, the second interior compartment extending longitudinally along the first rail assembly and configured to receive the connector member therein. The electrical outlet assembly is configured to be disposed at least partially within the first interior compartment, the electrical outlet assembly comprising an electrical outlet configured to be received through the opening such that a face of the electrical outlet is uncovered by the first rail assembly.

FIGURES

The features of various aspects are set forth with particularity in the appended claims. The various aspects, however, both as to organization and methods of operation, together with further objects and advantages thereof, may best be understood by reference to the following description, taken in conjunction with the accompanying drawings as follows.

FIG. 19 illustrates a perspective view of an end portion of a power rail assembly comprising an end cap, in accordance with at least one aspect of the present disclosure.

DESCRIPTION

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting example aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and are not to limit the scope thereof.

Figure 1:
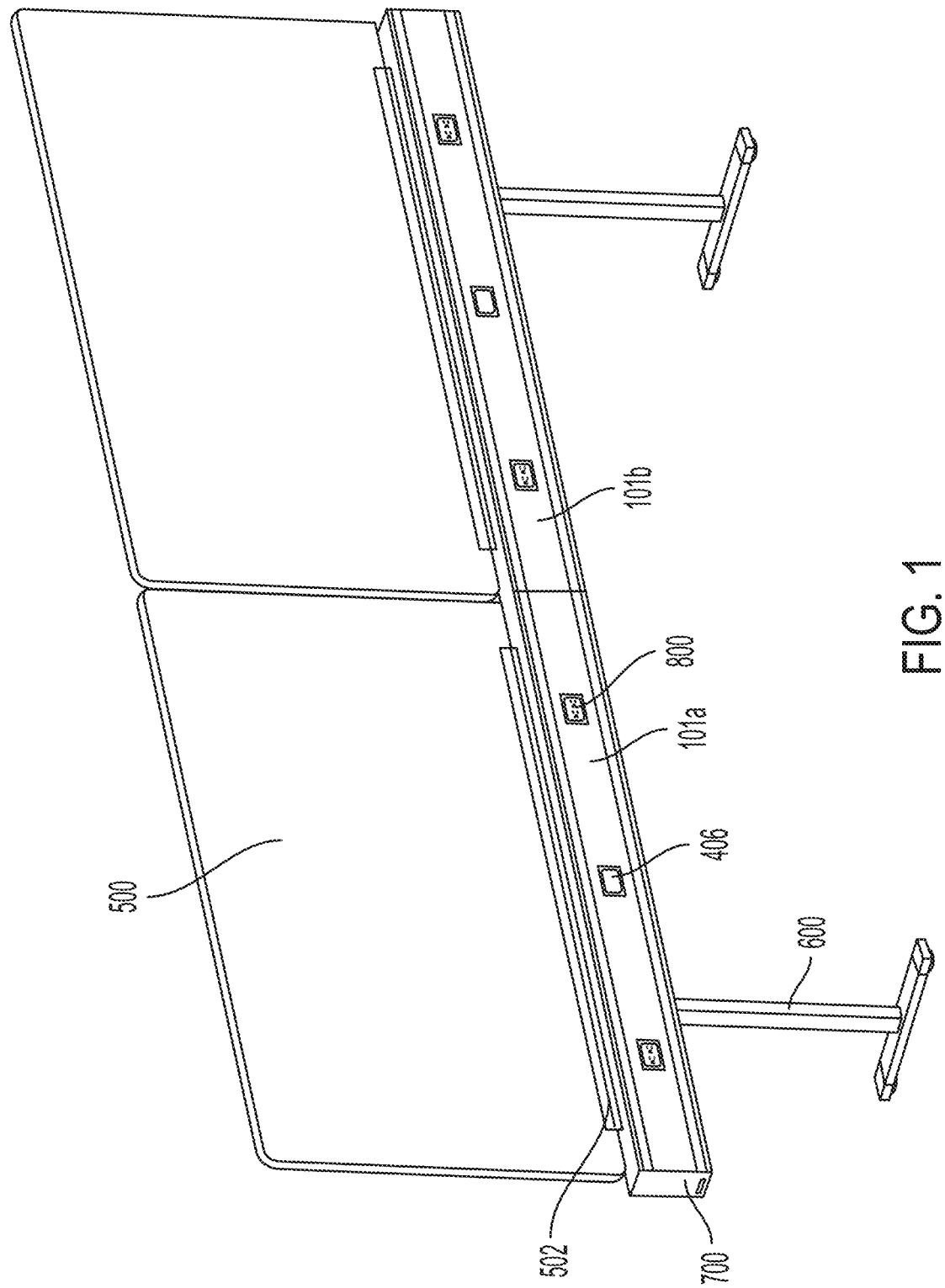
FIG. 1 is a perspective view of a power rail system, in accordance with at least one aspect of the present disclosure.
Figure 2:
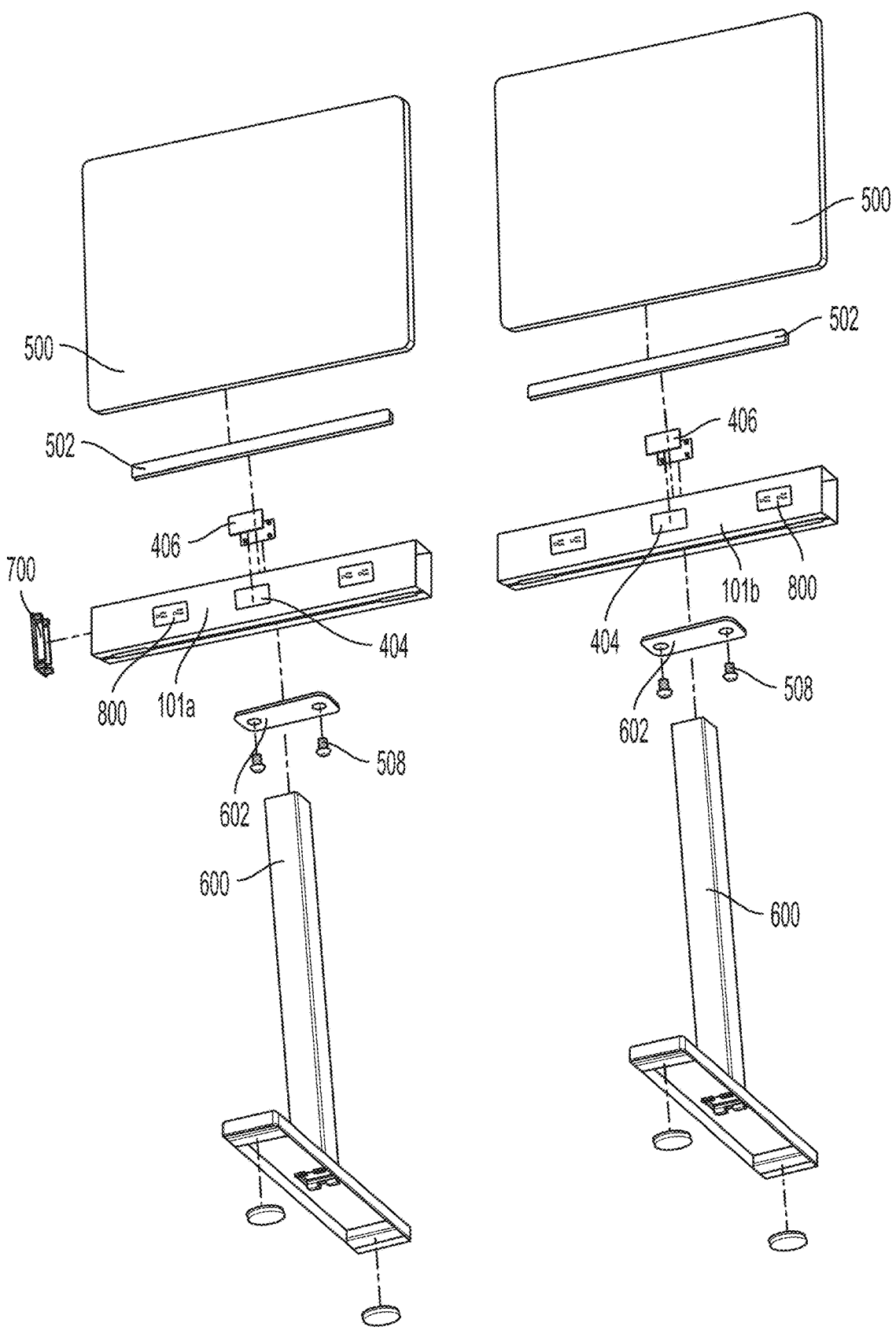
FIG. 2 is an exploded view of a power rail system, in accordance with at least one aspect of the present disclosure.

The present disclosure generally discloses a power rail system that can include a rail assembly (which can also be referred to as a "boom"), which can include one or more legs to support the rail assembly in a free-standing manner, and an electrical outlet assembly at least partially enclosed by the rail assembly. The power rail system is designed to allow the electrical outlet assembly to be freely positioned within a workspace in an organized and efficient manner, thereby allowing individuals to customize their workspace floorplan as they desire by allowing power to be brought to anywhere within the workspace. Further, the rail assemblies can be removably connected to corresponding rail assemblies to customize the size and/or configuration of the power rail system. For example, FIGS. 1 and 2 are a perspective view and an exploded view of a power rail system, respectively, in accordance with at least one aspect of the present disclosure. In the depicted example, the power rail system includes two rail assemblies that can be removably connected together; however, this is simply for illustrative purposes, and the power rail system can include any number of rail assemblies.

The example power rail system illustrated in FIGS. 1 and 2 comprises a first power rail assembly or section 101a and a second power rail assembly or section 101b removably joined together, as is described below. The power system further includes a power outlet assembly 800 that is at least partially enclosed by the respective rail section 101a, 101b. Each rail assembly 101a, 101b can further include one or more legs 600 that are attachable thereto. The number of legs 600 in use by the power rail system can be selected by the user and can depend in part upon the number of rail assemblies 101a, 101b that are connected together. For example, when a single rail assembly 101a, 101b is being utilized, it can be recommended to attach two legs 600 thereto. Conversely, when two rail assemblies 101a, 101b are connected together, as shown in FIG. 1, it can be recommended to attach only a single leg to each of the rail assemblies 101a, 101b because that provides enough stability for the power rail system.

Figure 10:
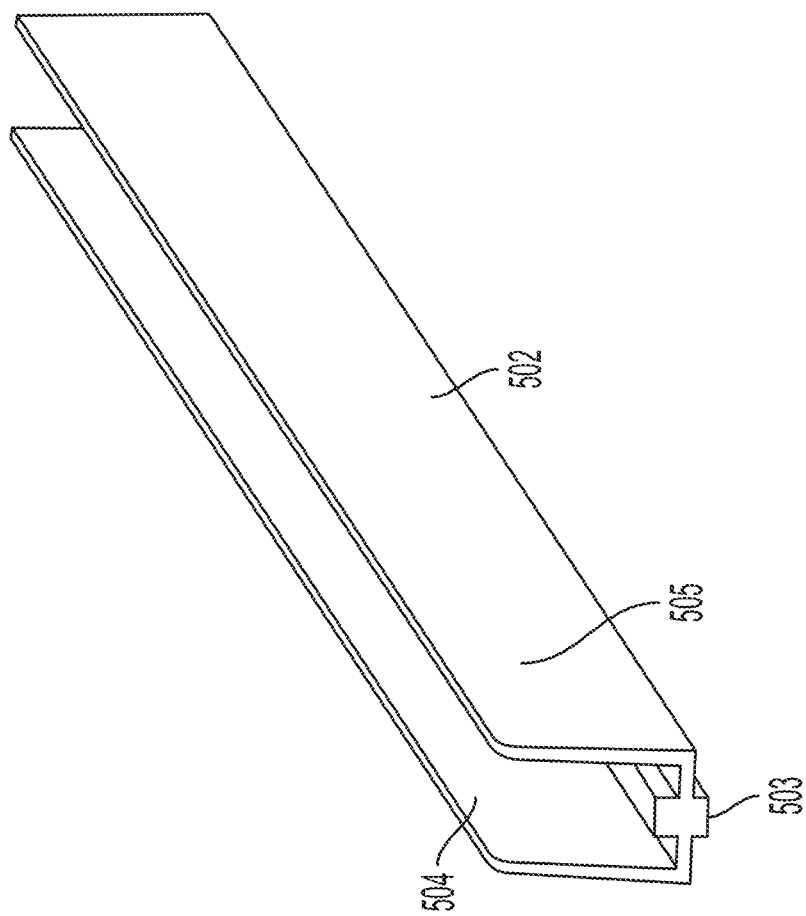
FIG. 10 illustrates a perspective view of a privacy screen connector for attaching a privacy screen to a power rail assembly, in accordance with at least one aspect of the present disclosure.
Figure 11:
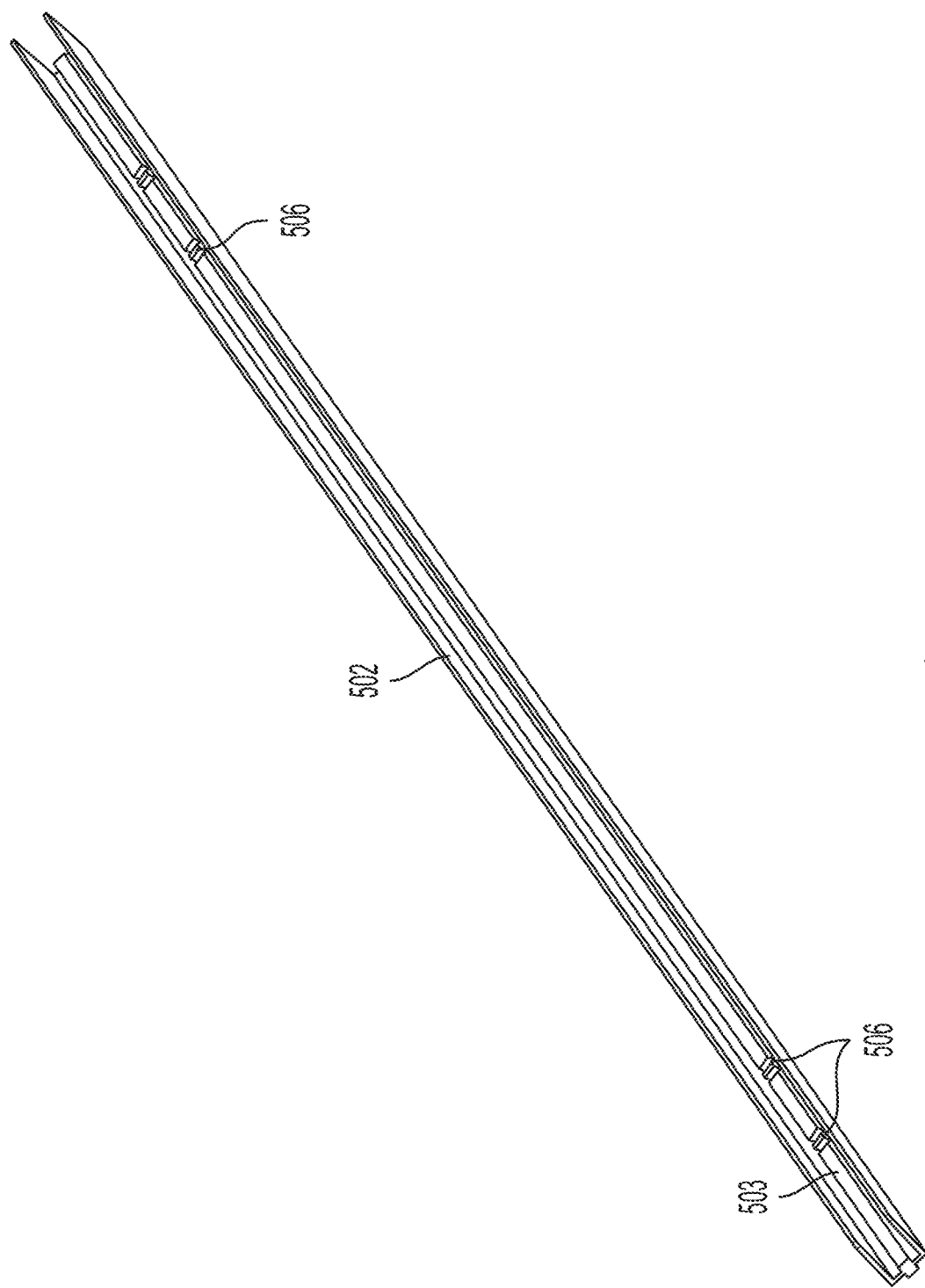
FIG. 11 illustrates an overheard perspective view of a privacy screen connector, in accordance with at least one aspect of the present disclosure.

Each power rail assembly 101a, 101b of the power rail system can further include a connector to which various accessories, such as a privacy screen 500 can be attached. For example, the power rail assemblies 101a, 101b can include a privacy screen connector 502 that is configured to be attached to the power rail assemblies 101a, 101b and is further configured to receive and secure a privacy screen 500 therein. The privacy screen connector 502 can include a U-shaped member that is configured to receive the privacy screen 500 therein, as shown in FIGS. 10 and 11, for example.

The rail assemblies 101a, 101b can include a variety of additional components, such as a cover 400 (FIGS. 7 and 8), a snap cover 406 for portions of the rail assemblies 101a, 101b unoccupied by a power outlet assembly 800, or an end cap 700, all of which are described further below.

Figure 3:
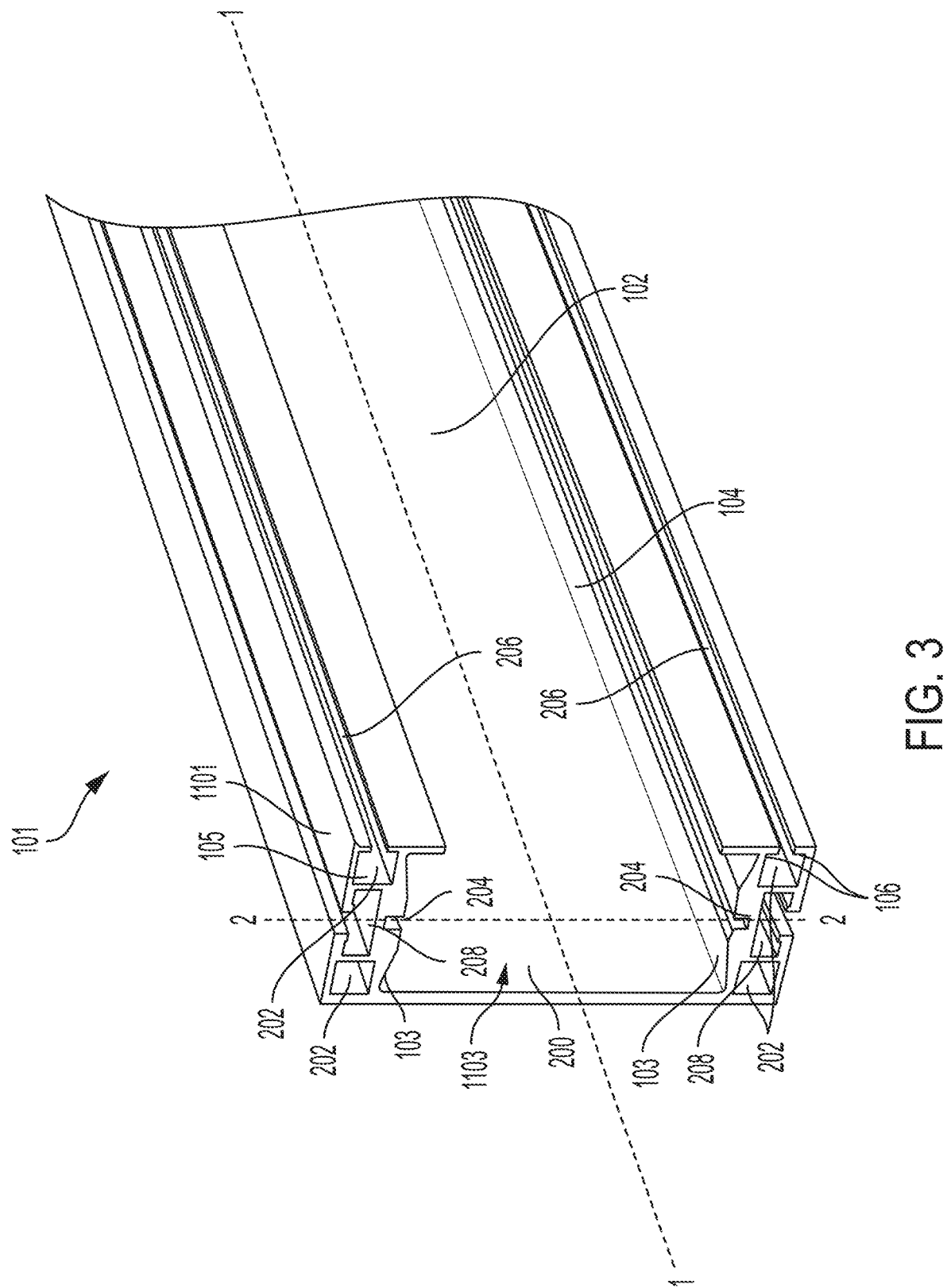
FIG. 3 illustrates a perspective view of a portion of a power rail assembly, in accordance with at least one aspect of the present disclosure.

As illustrated in FIG. 3, a power rail assembly 101 may comprise a member 200 that has, in the illustrated example, a generally C-shaped, open-faced profile. The member 200 can include an upright wall 102 and a pair of lateral or internal walls 103 extending perpendicularly therefrom. According to various aspects of the present disclosure, the cross-sectional profile of the member 200 may be formed by extruding a material through a die that corresponds to the C-shaped cross-sectional profile shown in FIG. 3. According to one aspect, the member 200 can be fabricated from a metal (e.g., aluminum), a polymer, a composite material, or another extrudable material. The power rail assembly 101 can further include one or more slots 208 positioned on the member 200. The slot 208 can be sized and configured for attachment of various additional components thereto, which is described in further detail below. The depicted aspect includes two slots 208 positioned at opposing ends of the member 200; however, this is simply an example, and other numbers and positions of the slot(s) 208 are possible. In the depicted aspect, the slots 208 are positioned adjacently to the opposing surfaces of the lateral walls 103. The power rail assembly 101 can further include one or more channels 202 that are configured to receive a connector member 300 (FIG. 5) therethrough for connecting the power rail assembly 101 to another power rail assembly (as shown in FIG. 1), which is described in further detail below. The channels 202 can define interior compartments that are sized and shaped to receive a connector member 300 therein. The depicted aspect includes four channels 202 arranged in opposing pairs, where each pair is positioned adjacently to a corresponding slot 208; however, this is simply an example, and other numbers and positions of the channel(s) 202 are possible.

In various aspects, the power rail assembly 101 can include various features for allowing components of the power rail system to be secured thereto. For example, the power rail assembly 101 can include a threaded slot 204 in communication with the interior portion(s) of the member 200 and/or a slot 208, which can be seen further in FIG. 19. The depicted aspect includes two threaded slots 204 positioned oppositely with respect to each other. In particular, each of the threaded slots 204 is positioned longitudinally along each of the adjoining surfaces between the slots 208 and the lateral walls 103 of the member 200. The threaded slots 204 can include threading that is configured to engage with corresponding threading of a fastener. The threaded slots 204 can be utilized to secure components of the power rail system within the interior 1103 of the member 200 and/or to the slot 208 via a fastener, which is described in further detail below. The interior 1103 can define an interior compartment that is at least partially enclosed by the walls 102, 103 of the member 200. The interior 1103 can be configured to receive various components therein, such as electrical outlet assemblies 800 (FIGS. 15-18). The power rail assembly 101 can further include a channel slot 206 in communication with a channel 202. The depicted aspect includes two channel slots 206 positioned longitudinally along the outer surfaces of the channels 202 that are oriented adjacently to the open portion of the C-shaped member 200. Further, the channel slots 206 are oriented perpendicularly with respect to the threaded slot(s) 204. The channel slots 206 can be utilized to permit a tool therethrough for securing fasteners, which is described in further detail below.

In various aspects, the power rail assembly 101 may be symmetrical in a top-to-bottom direction (e.g., about a plane extending horizontally through axis 1-1 perpendicular to the upright wall 102). For example, the member 200, channels 202, slots 208, threaded slots 204, and channel slots 206 can be symmetrical about the plane extending through axis 1-1. As another example, the upper and lower internal walls 103 of the member 200 can further be symmetrical about the plane extending through axis 1-1. As illustrated in FIG. 3, the internal walls 103 may comprise a curved profile 104. According to one aspect, such a curved profile 104 may assist in maintaining longitudinally extending elements (e.g., wires or cables) in place within the power rail assembly 101. For example, the curved profile 104 may urge the wires or cables located within the interior 1103 of the member 200 towards the internal corners between the upright wall 102 and the internal walls 103. Accordingly, the curved profile 104 may urge wires or cables away from components mounted to the threaded slots 204 extending longitudinally along the internal walls 103. In other aspects, various features of the power rail assembly 101 may be symmetrical in a side-to-side or lateral direction (e.g., about a plane extending vertically through axis 2-2 parallel to the upright wall 102). Such features may include the channels 202, lobes of the longitudinal slots 208, threads of the threaded slots 204, the curved profile 104 of the internal walls 103, and so on.

Figure 4:
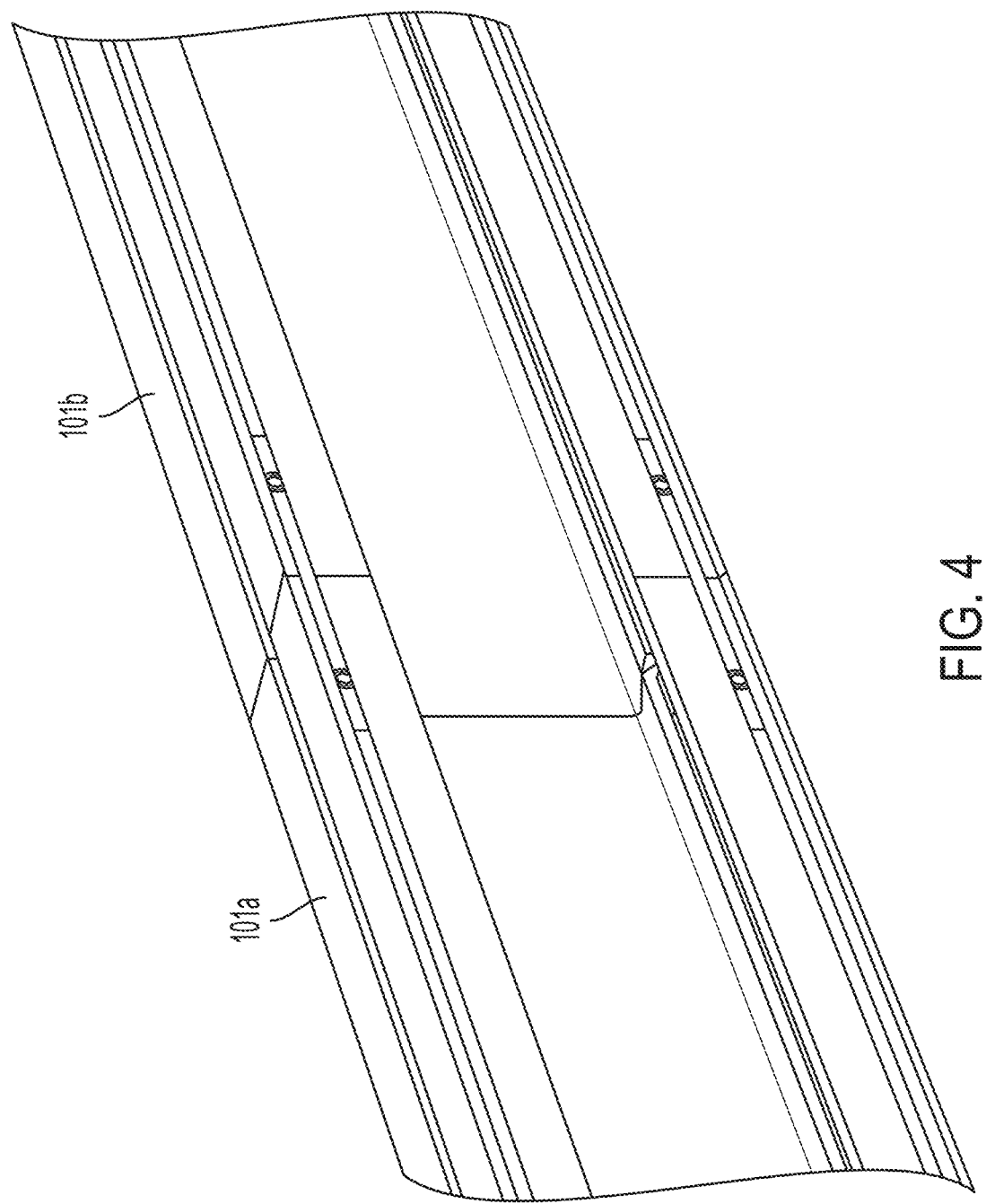
FIG. 4 illustrates a perspective view of a pair of attached power rail assemblies, in accordance with at least one aspect of the present disclosure.
Figure 5:
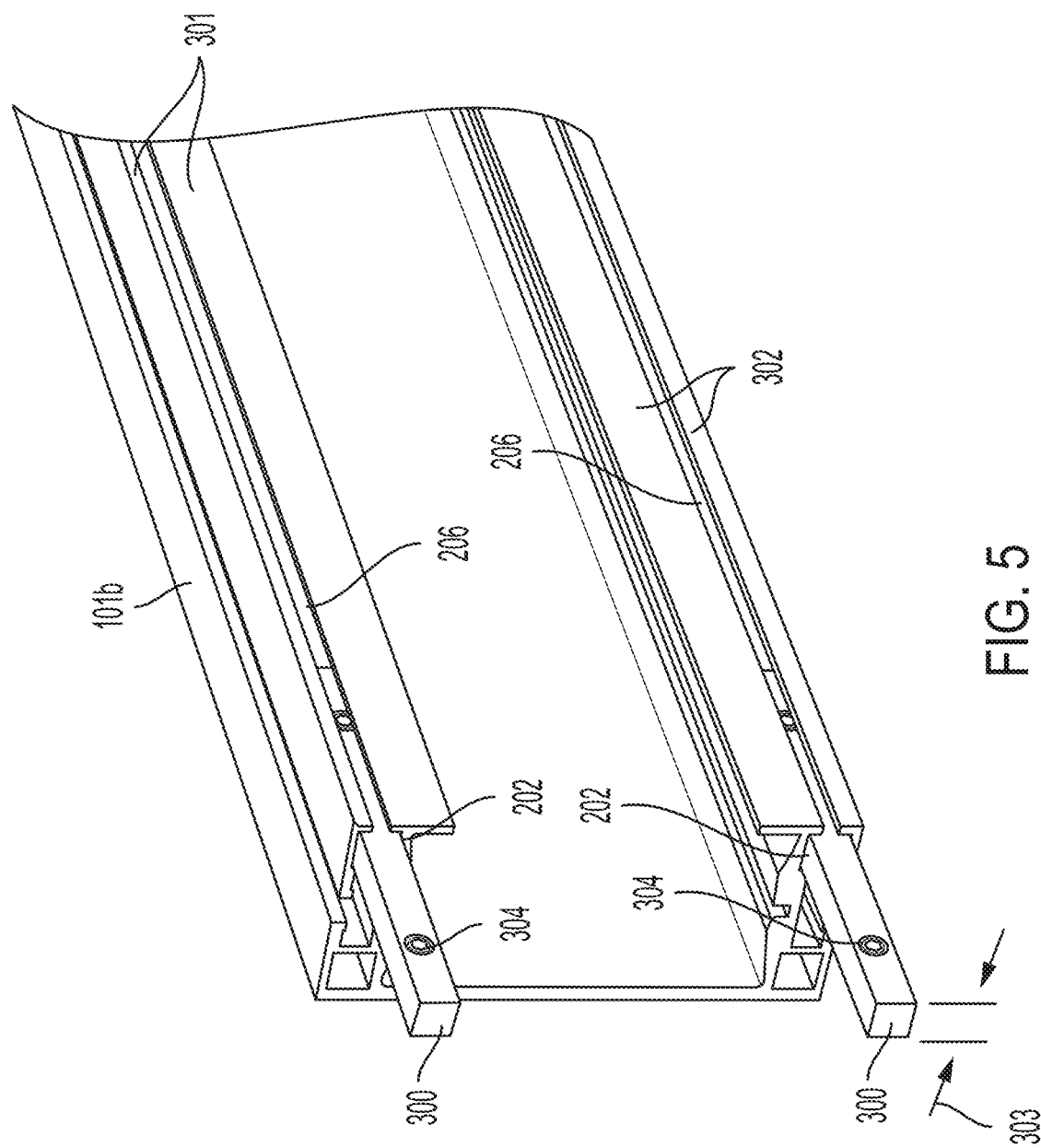
FIG. 5 illustrates a perspective view of a portion of a power rail assembly, including a connector member, in accordance with at least one aspect of the present disclosure.

As illustrated in FIG. 4, a first power rail assembly 101*a* is attachable to a second power rail assembly 101*b* and, in this example, is attachable to up to two other power rail assemblies (e.g., at each of its ends). The power rail assemblies 101*a*, 101*b* can be provided in different lengths, thereby allowing users to customize the size and/or configuration of the power rail system by selecting and attaching together power rail assemblies 101*a*, 101*b* of desired lengths. Referring now to FIG. 5, according to one aspect of the present disclosure, attachment between multiple power rail assemblies 101*a*, 101*b* may be enabled via one or more channels 202 (e.g., positioned proximal to the front-faced opening of the C-shaped, open-faced member 200) and a number (e.g., one or more) of connector members 300. The connector members 300 and the channels 202 can have complementary shapes such that the connector members 300 can be received and retain therein. Although the connector members 300 and the channels 202 are depicted as having a rectangular profile, other shapes, including circular, triangular, and hexagonal profiles, are contemplated by the present disclosure. According to various aspects of the present disclosure, each connector member 300 may be configured to slidably fit within each respective channel 202. Further, according to such aspects, each connector member 300 can be configured to be secured to each of the power rail assemblies 101*a*, 101*b* when positioned within the respective channels 202 of each of the power rail assemblies 101*a*, 101*b*. In one aspect, the connector member 300 can include two or more threaded apertures 304.

Figure 6:
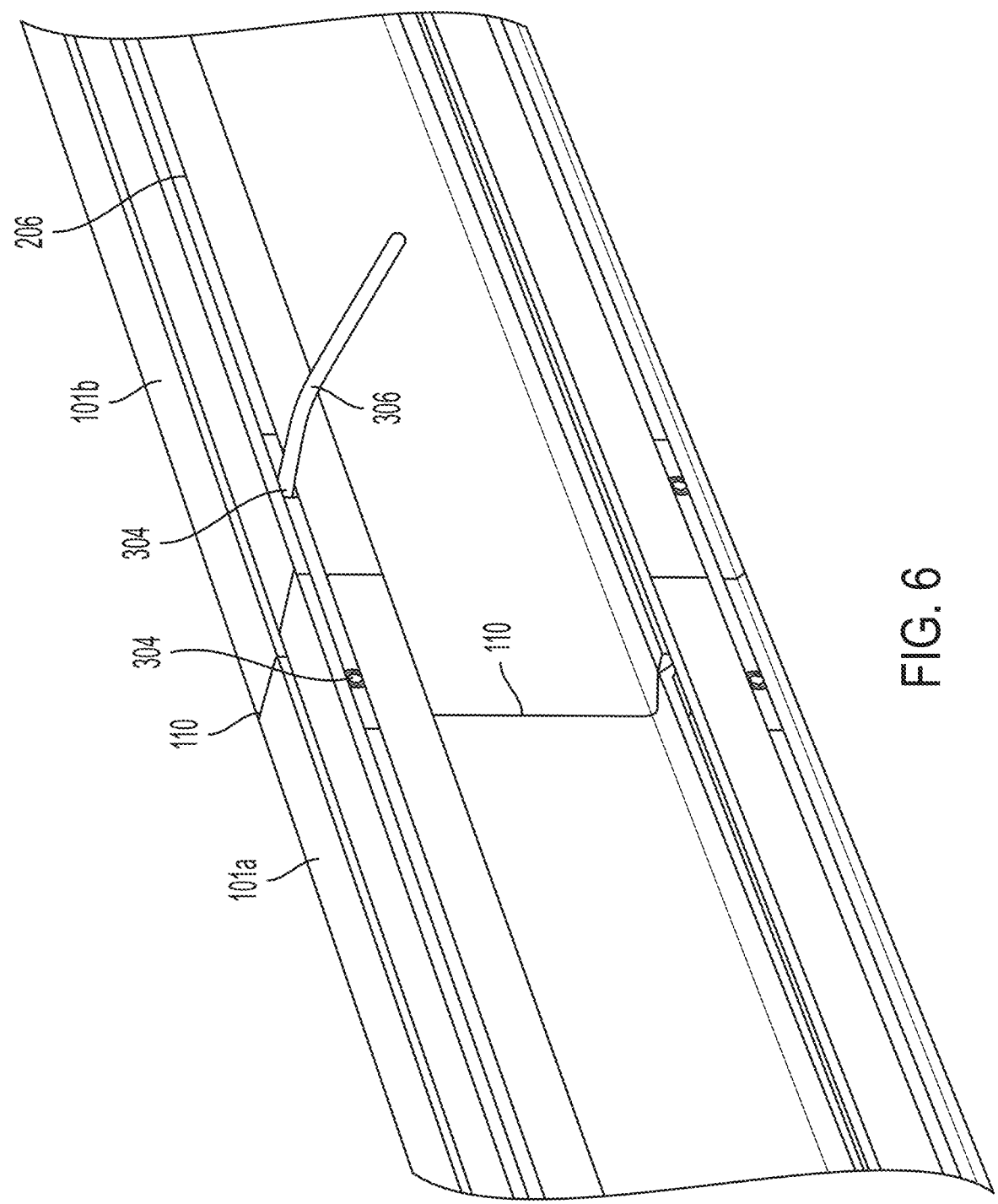
FIG. 6 illustrates a perspective view of a pair of power rail assemblies being attached together via connector members, in accordance with at least one aspect of the present disclosure.

Accordingly, the connector member 300 can be positioned within the channel 202 of the first power rail assembly 101*a* such that a fastener secured to one of the threaded apertures 304 secures the connector member 300 in place within that channel 202. Correspondingly, the connector member 300 can likewise be positioned within the channel 202 of the second power rail assembly 101*b* such that a fastener secured to the other threaded aperture 304 secures the connector member 300 in place within the channel 202. Because the connector member 300 is secured to each of the power rail assemblies 101*a*, 101*b*, the power rail assemblies 101*a*, 101*b* are thereby secured to each other. This process can then be repeated for multiple connector members 300, as desired by the user, to reinforce the connection between the power rail assemblies 101*a*, 101*b*. The internally threaded apertures 304 may extend through a thickness 303 of each connector member 300. In one implementation, the fasteners can be screwed into the threaded apertures 304 prior to insertion of each connector member 300 into its respective channel 202. In this implementation, each fastener may be screwed into the threaded apertures 304 to a depth that permits each connector member 300 to slide longitudinally within each respective channel 202 without interfering with an internal surface of each channel 202. Referring now to FIG. 6, once the connector member 300 is appropriately positioned (e.g., a first portion of each connector member 300 is positioned within a channel 202 of the first power rail assembly 101*a* and a second portion of the connector member 300 in positioned within a corresponding channel 202 of the second power rail assembly 101*b*), each fastener engaged with a respective threaded aperture 304 may be tightened to interferingly secure each connector member 300 to each of the power rail assemblies 101*a*, 101*b*. Referring back to FIG. 3, as the fastener is tightened, the end of the fastener bears against an internal surface 105 of the channel 202, which in turn causes the connector member to be frictionally engaged or wedged against the opposite internal surface 106 of the channel 202 to secure the connector member 300 within the channel 202 and, thus, to that particular power rail assembly 101*a*, 101*b*.

Referring back to FIG. 6, the channel slots 206 may be dimensioned or configured such that a tool 306 (e.g., an Allen wrench) can be inserted therethrough to tighten the fasteners engaged with the threaded apertures 304 of the connector members 300. Once at least one connector member 300 is secured to both of the adjacent power rail assemblies 101*a*, 101*b*, the power rail assemblies 101*a*, 101*b* are effectively secured to one another via the connector member 300.

In the example shown in FIGS. 5 and 6, two channels 202 (i.e., the channels 202 positioned proximal to the front-faced opening of the member 200) and two connector members 300 have been utilized to secure the adjoining power rail assemblies 101*a*, 101*b* together. According to alternative aspects of the present disclosure, one or more of the two remaining illustrated channels 202 (i.e., the channels 202 positioned distal to the front-faced opening of the member 200) and up to two further connector members 300 may be utilized to further secure the adjoining power rail assemblies 101*a*, 101*b* together. According to one aspect, each of the distally positioned channels 202 may comprise a longitudinal channel slot 206 (not shown), as with each of the proximally positioned channel slots 206 to exhibit similar functionality using the additional connector members 300. According to another aspect, each of the distally positioned channels 202 may not comprise a longitudinal channel slot 206 and the two additional connector members 300 may simply float within the distally positioned channels 202. In such aspects, the additional connector members 300 in the distally positioned channels 202 can further secure the power rail assemblies 101*a*, 101*b* together and prevent separation at the seam 110 where the adjoining edges of the power rail assemblies 101*a*, 101*b* meet. Absent the additional connector members 300, separation could occur at the seam 110 during physical movement or manipulation of attached power rail assemblies 101*a*, 101*b*, for example.

Figure 7:
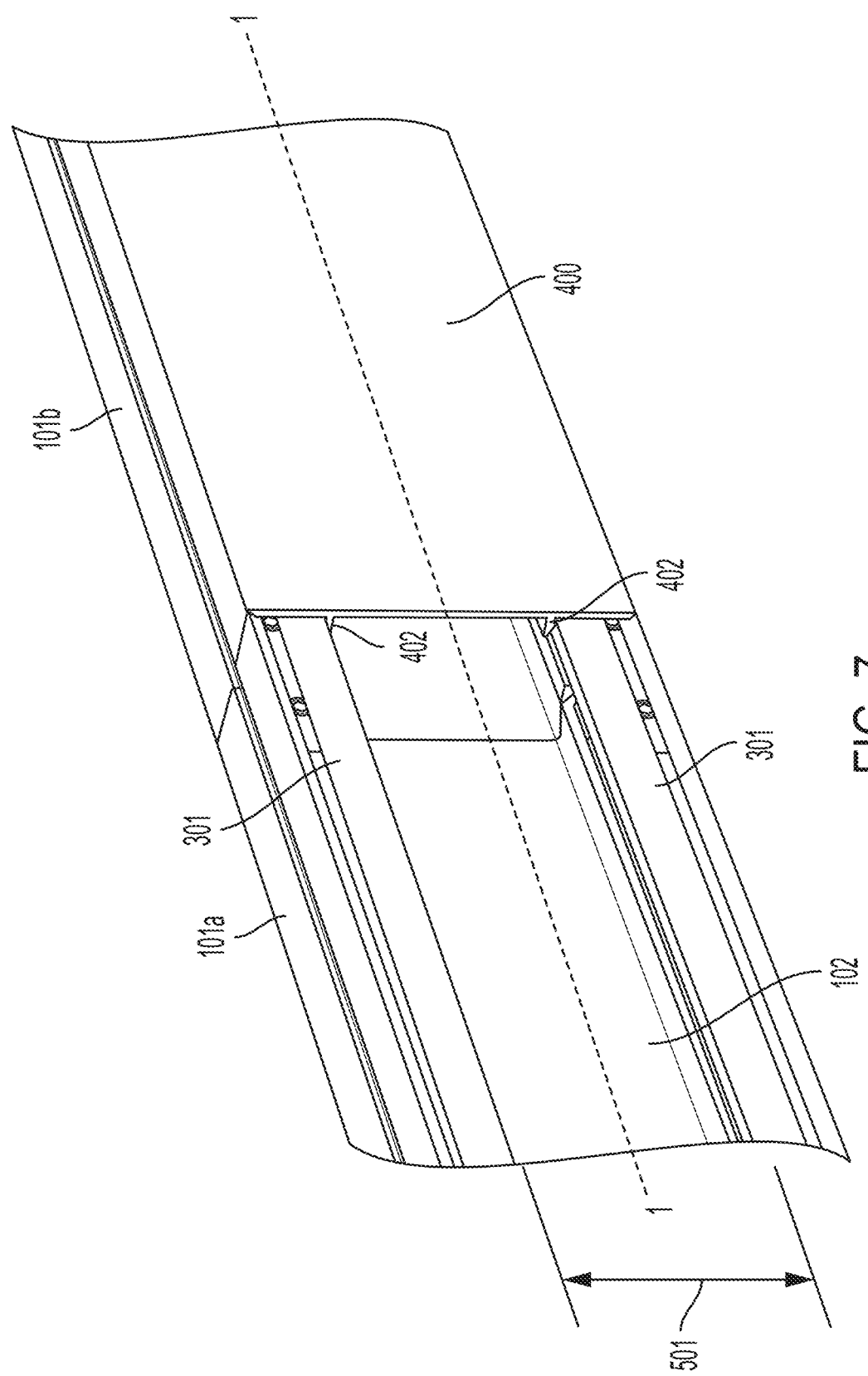
FIG. 7 illustrates a perspective view of a pair of attached power rail assemblies, including a cover positioned thereover, in accordance with at least one aspect of the present disclosure.
Figure 8:
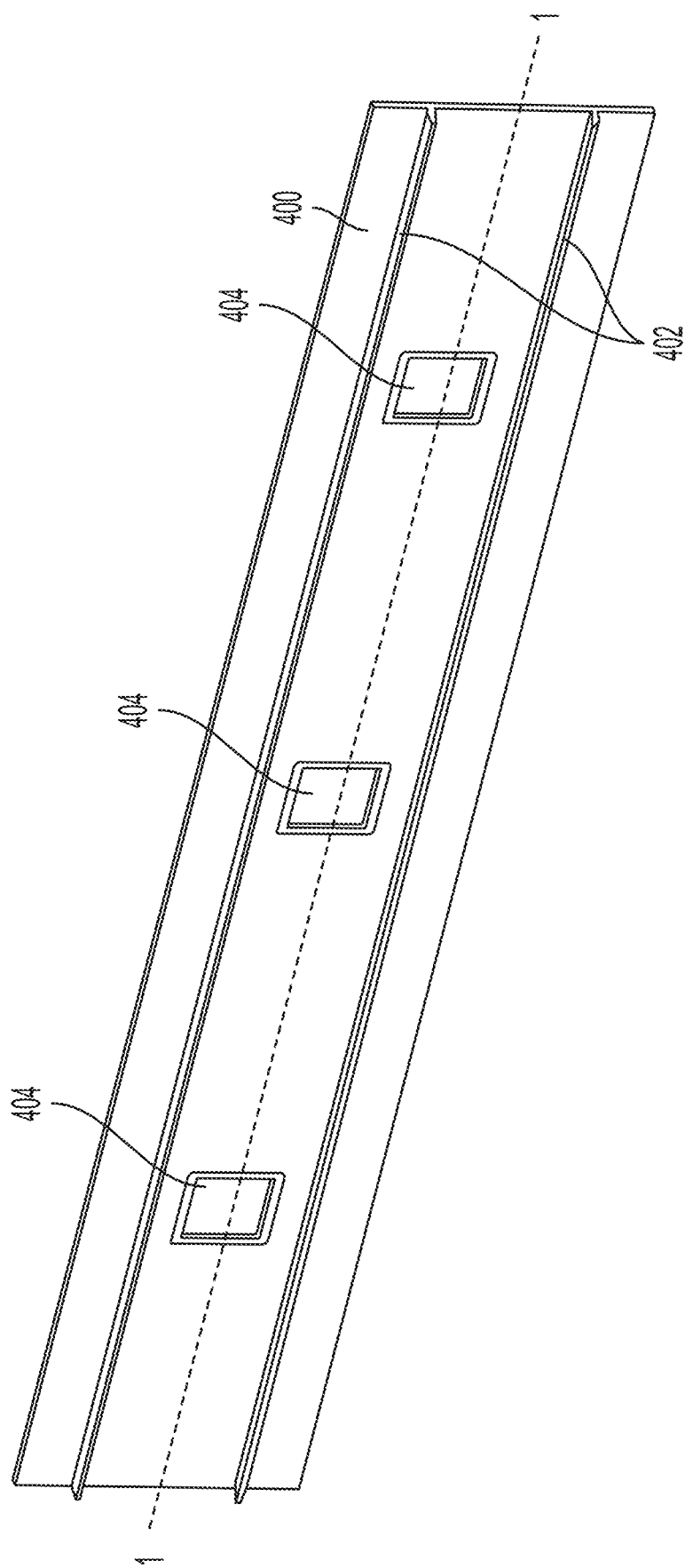
FIG. 8 illustrates a perspective view of a power rail assembly cover, in accordance with at least one aspect of the present disclosure.

Referring now to FIG. 7, the power rail assembly 101*a*, 101*b* can further comprise a cover 400. According to various aspects of the present disclosure, the cover 400 may be formed by extruding a material through a die that corresponds to its cross-sectional profile. According to one aspect, the cover 400 can be fabricated from a metal (e.g., aluminum), a polymer, a composite material, or another extrudable material. The cover 400 can comprise snap features 402 configured to engage with the walls 301 of the member 200 defining the opening 501 (which also define, in part, the channel slot 206) and interferingly and/or fittingly attach the cover 400 to the member 200, as is also shown in FIG. 19. According to one aspect of the present disclosure, each snap feature 402 comprises a hook-like feature configured to hook over a corresponding wall 301 of the member 200. Referring now to FIG. 8, in one aspect, the snap features 402 can extend along the length of the cover 400 to more securely attach the cover 400 to a power rail assembly 101 (i.e., by providing a long interacting surface area). According to alternative aspects, a plurality of fasteners (not shown) may be utilized in lieu of or in addition to the snap features 402 to attach (or further attach) the cover 400 to the member 200. The cover 400 is configured to cover or enclose the contents of the power rail assembly 101, which can include power outlets, power lines/components, data lines/components, voice lines/components, and so on.

Each cover 400 may be symmetrical top to bottom (e.g., about a plane extending horizontally through axis 1-1 perpendicular to the upright wall 102), similarly as described above with respect to the power rail assembly 101 in FIG. 3. For example, each snap feature 402 may comprise a hook-like feature symmetrical about the plane extending through axis 1-1. Furthermore, according to various aspects, cutouts or openings 404 may be defined in the face of the cover 400. According to such aspects, the openings 404 may be located and sized to accommodate various power or electrical components (e.g., power outlets, data jacks, or voice jacks) installed within or mounted to the power rail assembly 101, which are described in greater with respect to FIGS. 15-18.

Figure 9:
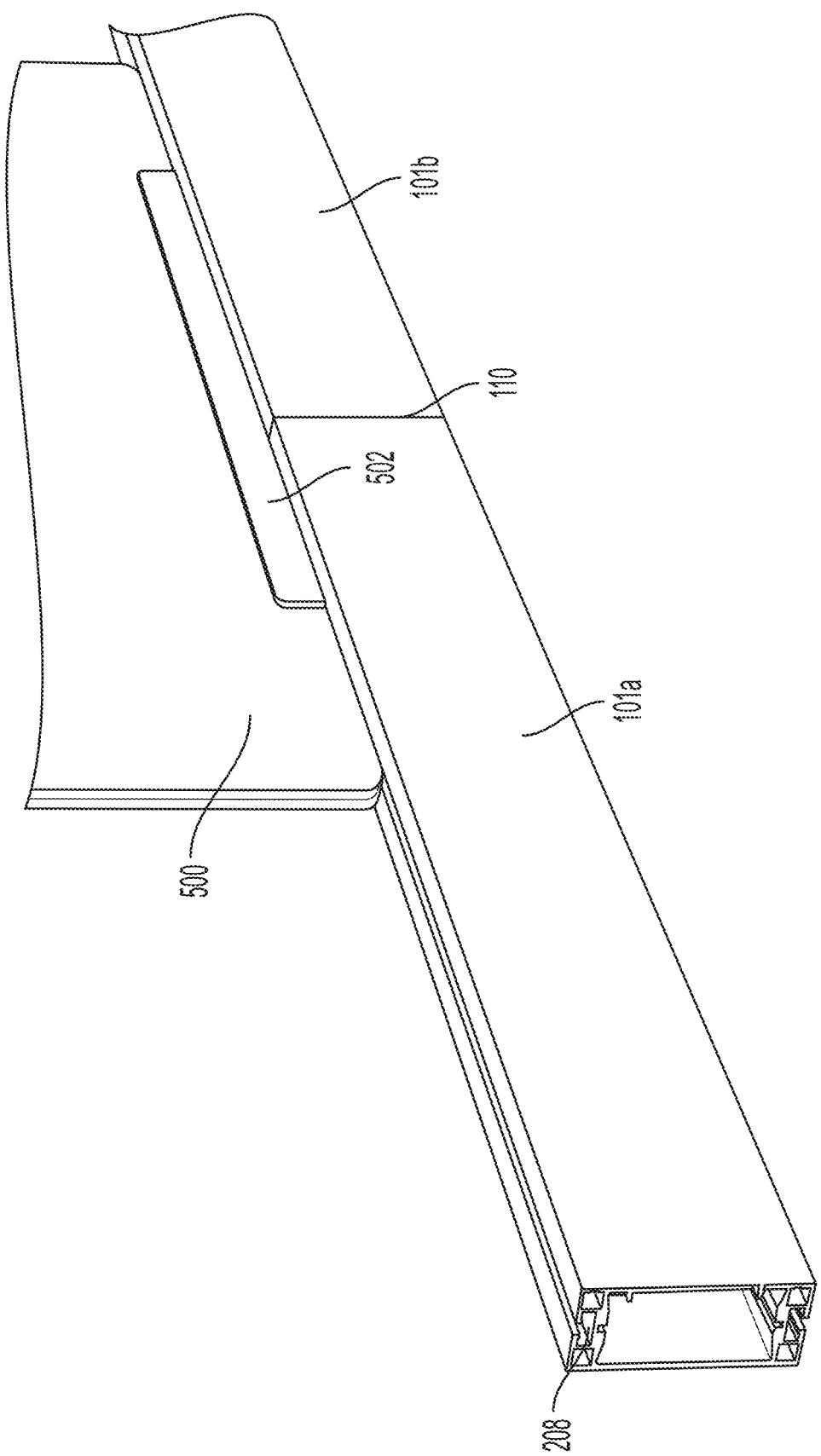
FIG. 9 illustrates a perspective view of a privacy screen attached to a pair of power rail assemblies, in accordance with at least one aspect of the present disclosure.

In various aspects, the power rail system can further include a variety of accessories that are attachable to the longitudinal slots 208 described above. For example, FIG. 9 illustrates a privacy screen 500 that can be attached the longitudinal slot 208 of one or more power rail assemblies 101*a*, 101*b*. In some implementations, the longitudinal slots 208 of power rail assemblies 101*a*, 101*b* can be configured to be continuous when the power rail assemblies 101*a*, 101*b* are connected together, such that the privacy screen 500 can be positioned across the seam 110 between the adjoining power rail assemblies 101*a*, 101*b*. According to one aspect, the privacy screen 500 can be indirectly attached to the longitudinal slots 208, i.e., by an intervening component. For example, as illustrated in FIG. 9, the privacy screen 500 can be removably connectable to a privacy screen connector 502, which may in turn be removably connectable to the channel slots 208 of one or more power rail assemblies 101*a*, 101*b*. Referring now to FIG. 10, the privacy screen connector 502 can include a protrusion 503 configured to fit into the longitudinal slot(s) 208. According to one aspect of the present disclosure, the protrusion 503 of the privacy screen connector 502 can be configured to slidably fit into the longitudinal slot 208. According to another aspect, the protrusion 503 of the privacy screen connector 502 can be configured to snuggly or interferingly fit into the longitudinal slot 208. According to various aspects of the present disclosure, the privacy screen connector 502 may be formed by extruding a material through a die that corresponds to its cross-sectional profile. According to one aspect, the privacy screen connector 502 can be fabricated from a metal (e.g., aluminum), a polymer, a composite material, or another extrudable material.

The privacy screen connector 502 can further include sidewalls 504, 505 that are formed or configured to compressively hold the privacy screen 500 in place in an upright position. According to one aspect, a distance between the sidewalls 504, 505 proximal to the protrusion 503 (e.g., a first distance) may be larger than a distance between the sidewalls 504, 505 distal from the protrusion 503 (e.g., a second distance). In such an aspect, the privacy screen 500 may exhibit a thickness substantially equal to the first distance such that the sidewalls 504, 505 progressively compress and/or clamp the privacy screen 500 between the first distance and the second distance as the privacy screen 500 is inserted into or held by the privacy screen connector 502.

Figure 12:
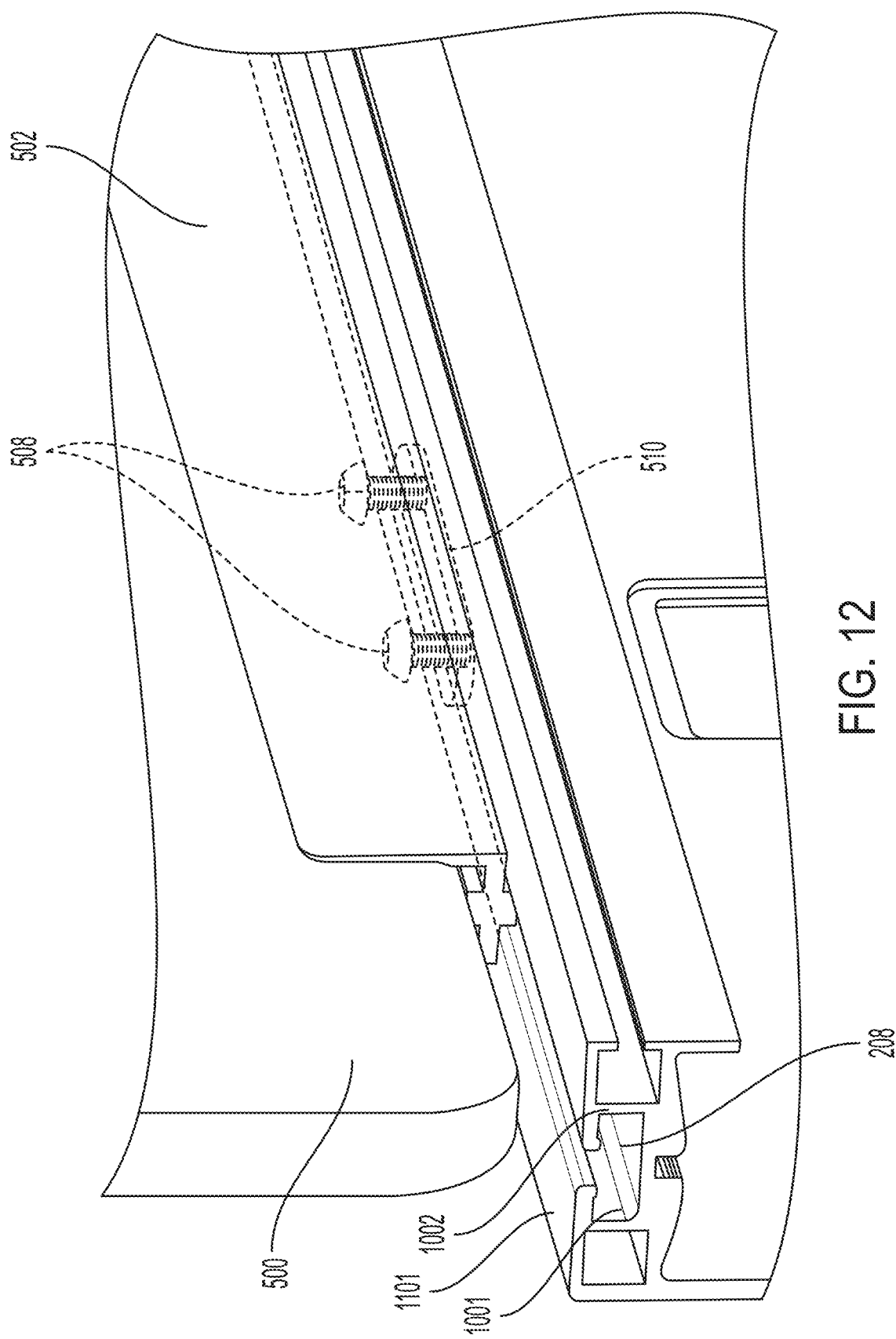
FIG. 12 illustrates a perspective view of a privacy screen connector attached to a power rail assembly via a mounting bracket, in accordance with at least one aspect of the present disclosure.

Referring now to FIG. 11, attachment points 506 (e.g., fastener apertures) may be defined in the protrusion 503 for fixedly attaching the privacy screen connector 502 to one or more respective power rail assemblies 101. The attachment points 506 may be positioned anywhere along the length of the privacy screen connector 502. The attachment points 506 may be clustered together (as shown in FIG. 11) or not clustered together. As shown in FIG. 12, the privacy screen connector 502 can be secured to the power rail assembly 101 by positioning fasteners 508 through the attachment points 506 of the privacy screen connector 502 into corresponding threaded apertures of a mounting bracket 510 such that the fasteners 508 may be tightened or loosened external to the longitudinal slot 208. The mounting bracket 510 can be configured or sized to slide within the longitudinal slot 208 to allow the privacy screen connector 502 to be positioned anywhere along the power rail assembly 101 (or power assemblies 101 when multiple are connected together). According to various aspects, the threaded apertures of the mounting bracket 510 can be located to mirror the positions (e.g. grouped/non-grouped) of the attachment points 506. In an alternative aspect, the apertures defined in the mounting bracket 510 may be non-threaded and the fasteners 508 may instead be configured to engage with threaded nuts, as opposed to the mounting bracket 510 itself. In yet another aspect, the mounting bracket 510 may be omitted and the fasteners 508 may extend through the attachment points 506 of the privacy screen connector 502 and engage with threaded nuts (not shown) positioned within the longitudinal slot 208. According to such an aspect, the threaded nuts may be sized to fit within the longitudinal slot 208 such that they do not rotate (i.e., interfere with the sidewalls 1001, 1002 of the longitudinal slot 208) such that the fasteners 508 may be tightened or loosened external to the longitudinal slot 208.

Figure 13:
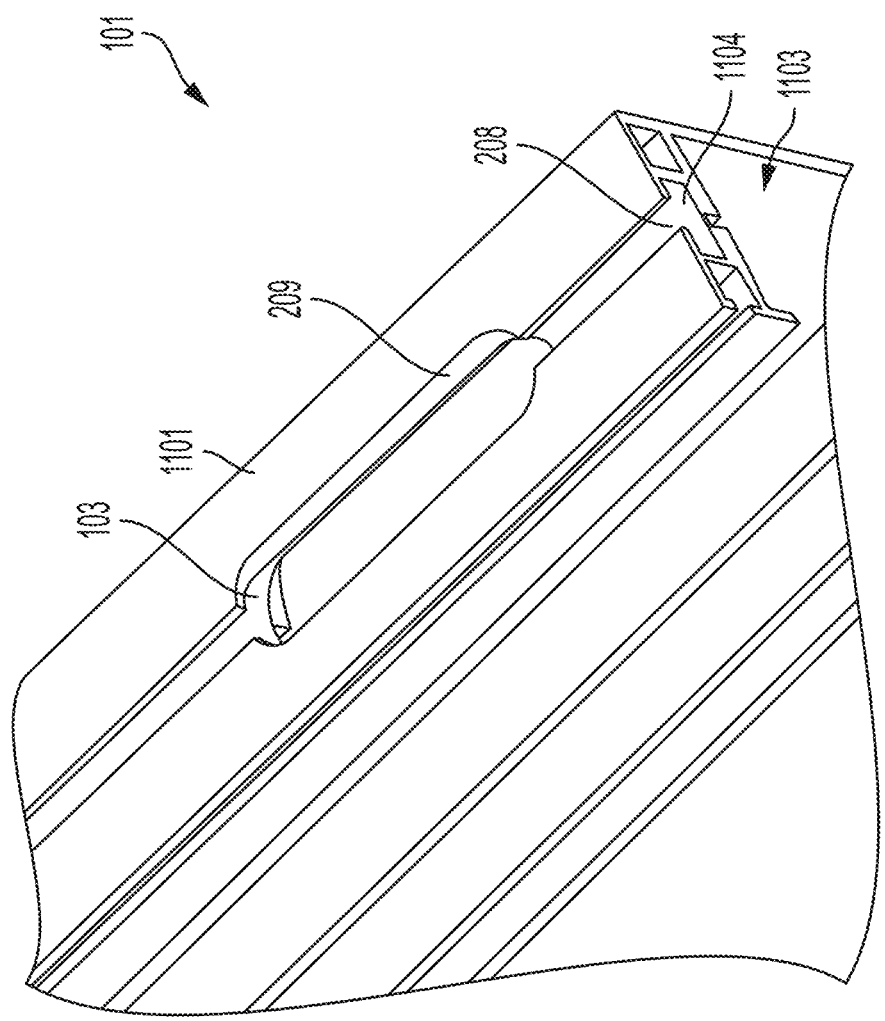
FIG. 13 illustrates an overhead perspective view of an end portion of a power rail assembly, including mounting holes, in accordance with at least one aspect of the present disclosure.

Referring now to FIG. 13, the power rail assembly 101 can further include one or more mounting holes 209 defined though the longitudinal slot 208 and/or the exterior of the power rail assembly 101. The mounting holes 209 can be utilized in cooperation with mounting brackets 510 for attaching accessories, such as a privacy screen 500, to the power rail assembly 101. The mounting holes 209 could also provide access to threaded nuts (which could be loosely attached to the privacy screen connector 502 via fasteners 508, for example) that have been inserted into the longitudinal slot 208 before tightening the fasteners 508 to secure the privacy screen connector 502 to a power rail assembly 101. Such mounting holes 209 may be positioned anywhere along the length of the power rail assembly 101.

In one aspect, the mounting hole 209 can extend through an exterior wall 1101 (which corresponds to an outer wall of the power rail assembly 101 that at least partially encloses the channel(s) 202 and/or longitudinal slot 208 thereunder, as shown in FIGS. 3 and 13) and a lateral wall 103 (as shown in FIGS. 3 and 13) of the power rail assembly 101 into the interior 1103 thereof. This enables access to the interior 1103 for wire routing, for example. In an alternative aspect, the mounting holes 209 can only extend through the exterior wall 1101 and not through the lateral wall 103 into the interior 1103 of the power rail assembly 101. This aspect may be beneficial in implementations where it is desirable to keep the interior 1103 enclosed (e.g., to keep items from falling into interior 1103). In yet another aspect, a subset of the mounting holes 209 may extend through both the exterior wall 1101 and the lateral wall 103 and a separate subset of the mounting holes 209 extend through only the exterior wall 1101. In yet another aspect, the mounting holes 209 can be omitted and the mounting bracket 510 and/or the threaded nuts may be configured to slide into an end 1104 of the longitudinal slot 208 to position the privacy screen connector 502 along the length of the longitudinal slot 208 of the power rail assembly 101. Once positioned, the fasteners 508 may be tightened to secure the privacy screen connector 502 in place, and the privacy screen 500 may thereafter be inserted into the privacy screen connector 502, as shown in FIG. 9, for example.

Figure 14:
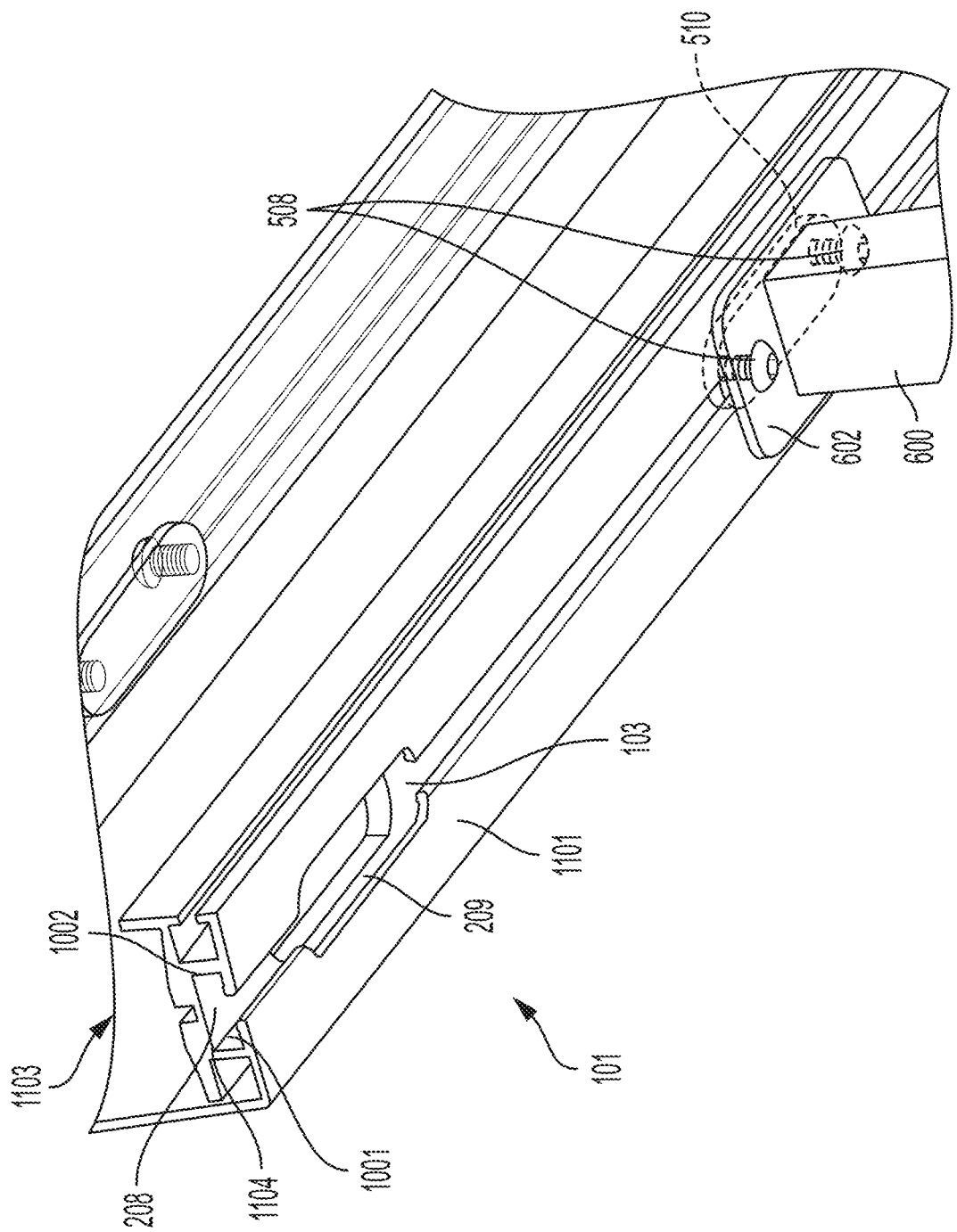
FIG. 14 illustrates a perspective view of a leg attached to a power rail assembly via a mounting bracket, in accordance with at least one aspect of the present disclosure.

Similarly to how a privacy screen 500 can be connected to the power rail assembly 101 as shown in FIG. 13, a similar mechanism can be utilized to attach other accessories, such as legs, to the power rail assembly 101. For example, FIG. 14 illustrates a leg 600 (see also FIGS. 1 and 2) attached to a longitudinal slot 208. The longitudinal slot 208 to which the leg 600 is attached can be oriented oppositely with respect to the longitudinal slot 208 to which the privacy screen 500 is attached in the example shown in FIG. 13. As shown in FIG. 14, the leg 600 can be secured to the power rail assembly 101 by positioning fasteners 508 through the apertures of the leg flange 602 into corresponding threaded apertures of a mounting bracket 510 such that the fasteners 508 may be tightened or loosened external to the longitudinal slot 208. The mounting bracket 510 can be configured or sized to slide within the longitudinal slot 208 to allow the leg 600 to be positioned anywhere along the power rail assembly 101 (or power assemblies 101 when multiple are connected together). According to various aspects, the threaded apertures of the mounting bracket 510 can be located to mirror the positions of the apertures of the leg flange 602. According to various aspects, the apertures defined in the leg flange 602 can be located such that the same mounting bracket 510 can be used in more than one application (e.g., to attach either a privacy screen connector 502 for a privacy screen 500 or a leg 600). According to another aspect, the apertures defined in mounting bracket 510 may non-threaded and the fasteners 508 may extend through the apertures of the leg flange 602, through non-threaded holes of the mounting bracket 510 and into threaded nuts (not shown). In an alternative aspect, the mounting bracket 510 may be omitted and the fasteners 508 may extend through apertures of the leg flange 602 and into threaded nuts. According to such an aspect, the threaded nuts may be sized to fit within the longitudinal slot 208 such that they do not rotate (i.e., interfere with the sidewalls 1001, 1002 of the longitudinal slot 208) such that the fasteners 508 may be tightened or loosened external to the longitudinal slot 208.

Further, as illustrated in FIG. 14, the mounting holes 209 may be defined through the longitudinal slot 208 to permit mounting brackets 510 and/or threaded nuts (which could be loosely attached to the leg flange 602 of a leg 600 via fasteners 508 through the apertures in the leg flange 602, for example) to slide into the longitudinal slot 208, prior to tightening the fasteners 508 to secure the leg 600 to a power rail assembly 101. Such mounting holes 209 may be positioned anywhere along the length of the power rail assembly 101.

According to one aspect, the mounting holes 209 can extend through the exterior wall 1101 and the lateral wall 103 of the power rail assembly 101 into an interior 1103 thereof. This enables access to the interior 1103 for wire routing or provides entry or exit for components located within the interior 1103 (e.g., power lines/components, data lines/components, and/or voice lines/components), for example. According to another aspect, the mounting holes 209 can only extend through the exterior wall 1101 and not through the lateral wall 103 into the interior 1103 of the power rail assembly 101. This aspect may be beneficial in implementations where it is desirable to keep the interior 1103 enclosed (e.g., to keep items from falling into interior 1103). In yet another aspect, a subset of the mounting holes 209 may extend through both the exterior wall 1101 and the lateral wall 103 and a separate subset of the mounting holes 209 extend through only the exterior wall 1101. In yet another alternative aspect, the mounting holes 209 can be omitted and the mounting bracket 510 and/or the threaded nuts may be configured to slide into an end 1104 of the longitudinal slot 208 to position the leg 600 along the length of the longitudinal slot 208 of the power rail assembly 101. Once positioned, the fasteners 508 may be tightened to secure the leg 600 and/or leg flange 602 in place, as shown in FIG. 14, for example.

Figure 15:
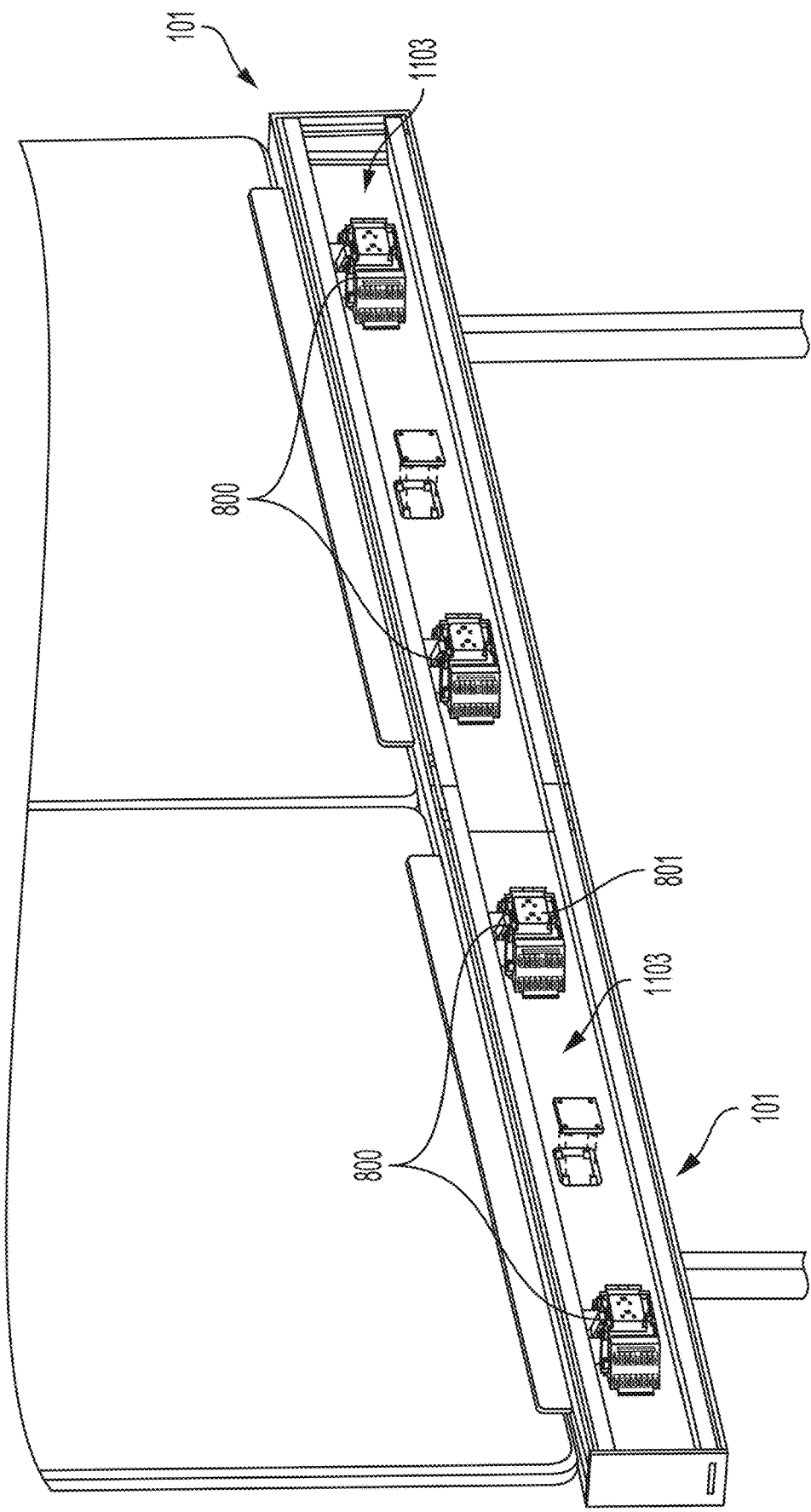
FIG. 15 illustrates a perspective view of power rail assemblies comprising electrical outlet assemblies, in accordance with at least one aspect of the present disclosure.
Figure 17:
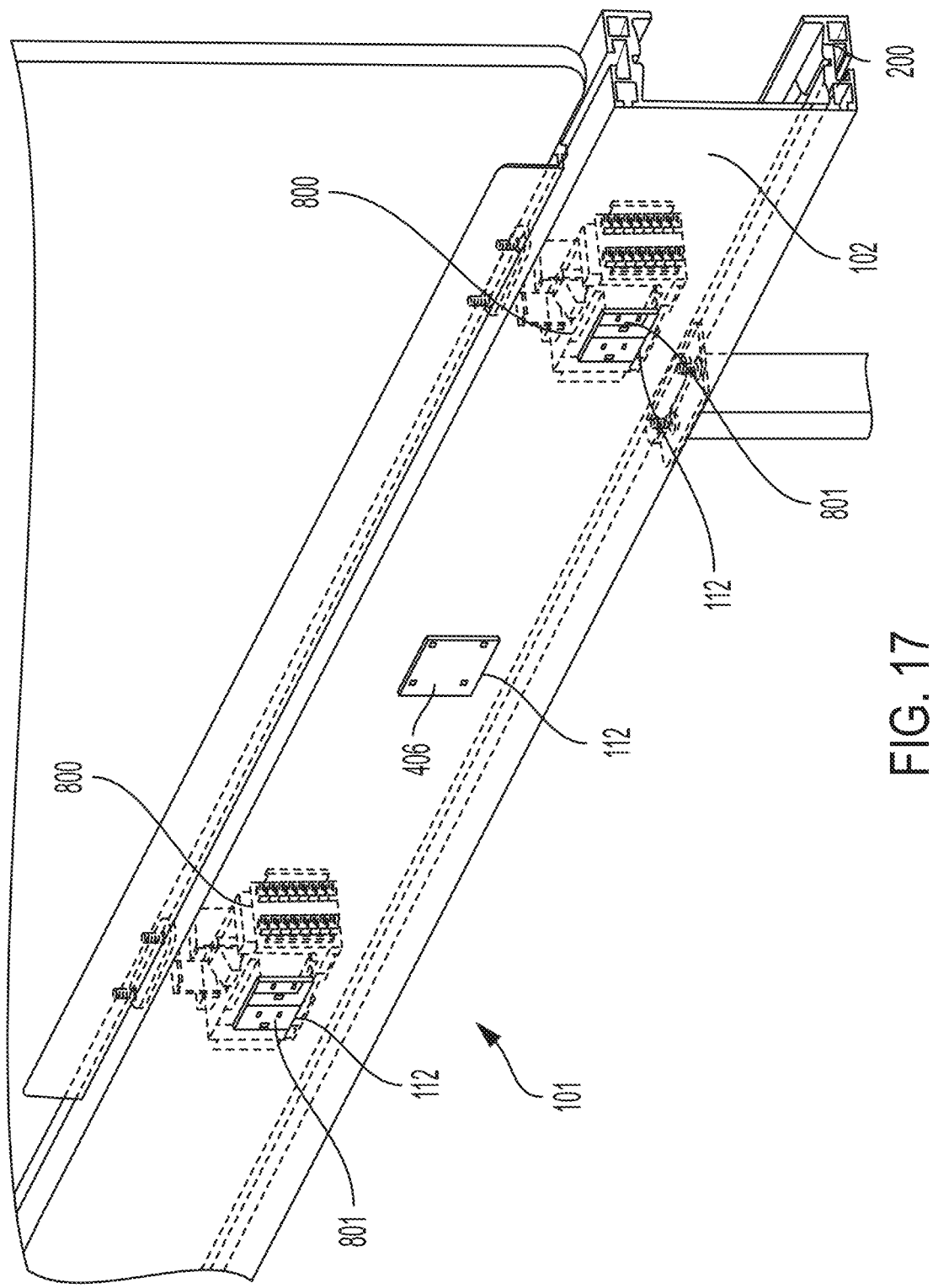
FIG. 17 illustrates a perspective view of a reverse side of a power rail assembly shown in FIG. 15, in accordance with at least one aspect of the present disclosure.

Referring now to FIG. 15, the power rail assembly 101 can further include one or more electrical outlet assemblies 800 disposed or attachable within the interior 1103 thereof. As shown in FIG. 17, the electrical outlet assemblies 800 can be mounted to the member 200 such that the face of the power outlet 801 extends through the openings 404 defined in the cover 400.

Figure 16:
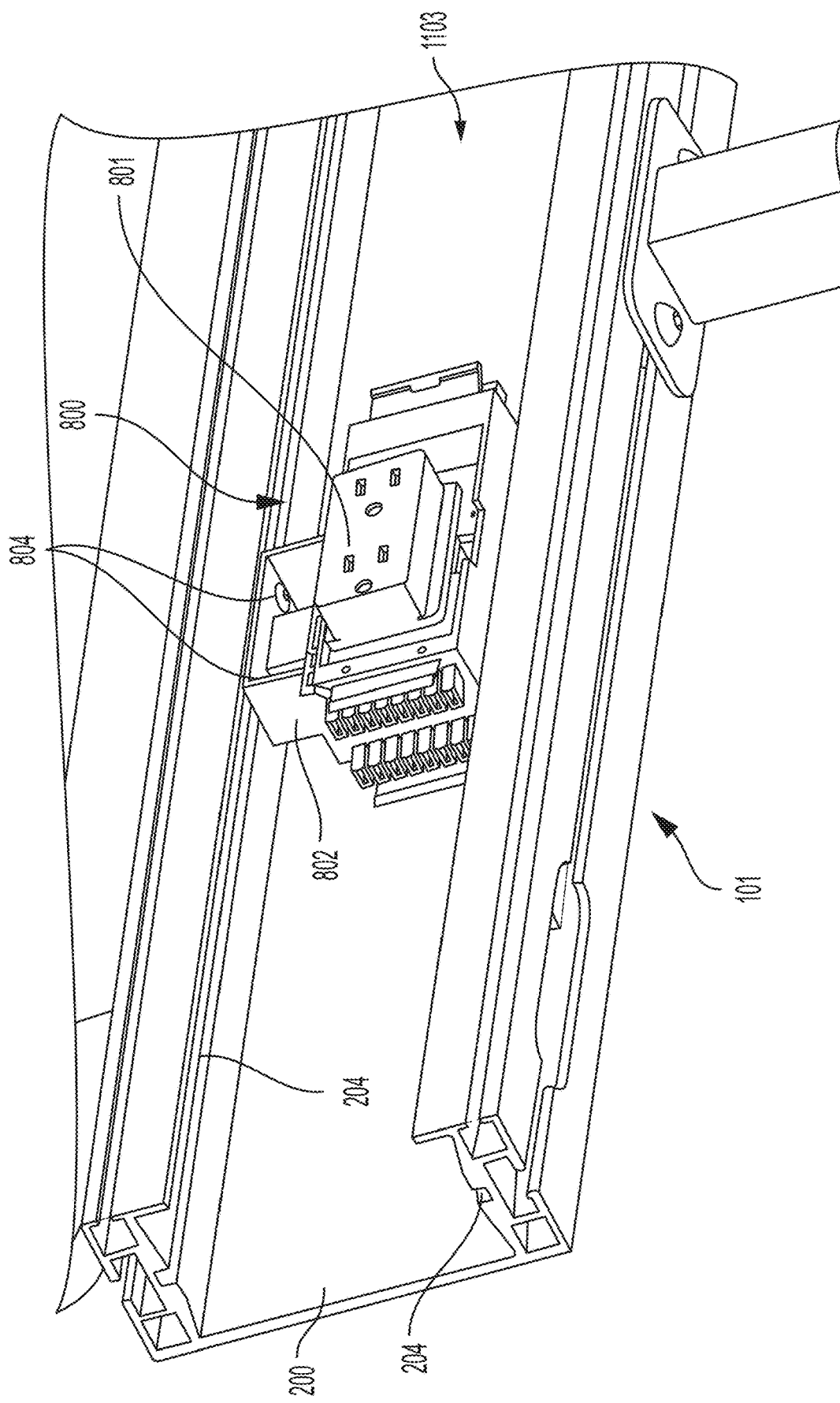
FIG. 16 illustrates a perspective view of an end portion of a power rail assembly shown in FIG. 15, in accordance with at least one aspect of the present disclosure.

Referring now to FIG. 16, in one aspect, the electrical outlet assembly 800 can be attached to the member 200 and held fixedly in place within the interior 1103 thereof via a bracket 802 and fasteners 804 (e.g., bolts). In one aspect, the fasteners 804 can be configured to thread directly into the threaded slot 204 of the power rail assembly 101. In one aspect, the threaded slot 204 can extend along the length of the member 200, thereby allowing the electrical outlet assemblies 800 to be affixed at any desired positon within the interior 1103 of the member 200. Such a longitudinally threaded slot 204 enables selective and/or flexible mounting of internal components (e.g., power outlet assemblies, data jack assemblies, or voice jack assemblies). Furthermore, the power rail assembly 101 can, in some aspects, include opposing threaded slots 204 extending longitudinally along the top and bottom portions of the member 200. Accordingly, the electrical outlet assemblies 800 and/or other accessories can be mounted along the top and/or bottom longitudinal threaded slots 204, as desired by the users.

The electrical outlet assemblies 800 can include power outlets 801 that are oriented, sized, and shaped to correspond to the openings 404 (FIG. 8) in the cover 400 (FIG. 8) such that the faces of the power outlets 801 extending through the openings 404 when the cover 400 is secured to the member 200. The electrical outlet assemblies 800 can include further power outlets 801 that are oriented, sized, and shaped to corresponding to cutouts or openings 112 defined in the upright wall 102 of a member 200, as shown in FIG. 17. Such openings 112 may be in addition to or as an alternative to the openings 404 defined in the cover 400. Accordingly, each electrical outlet assembly 800 can, in some aspects, be configured to provide an accessible power outlet 801 on both sides of a power rail assembly 101.

Figure 18:
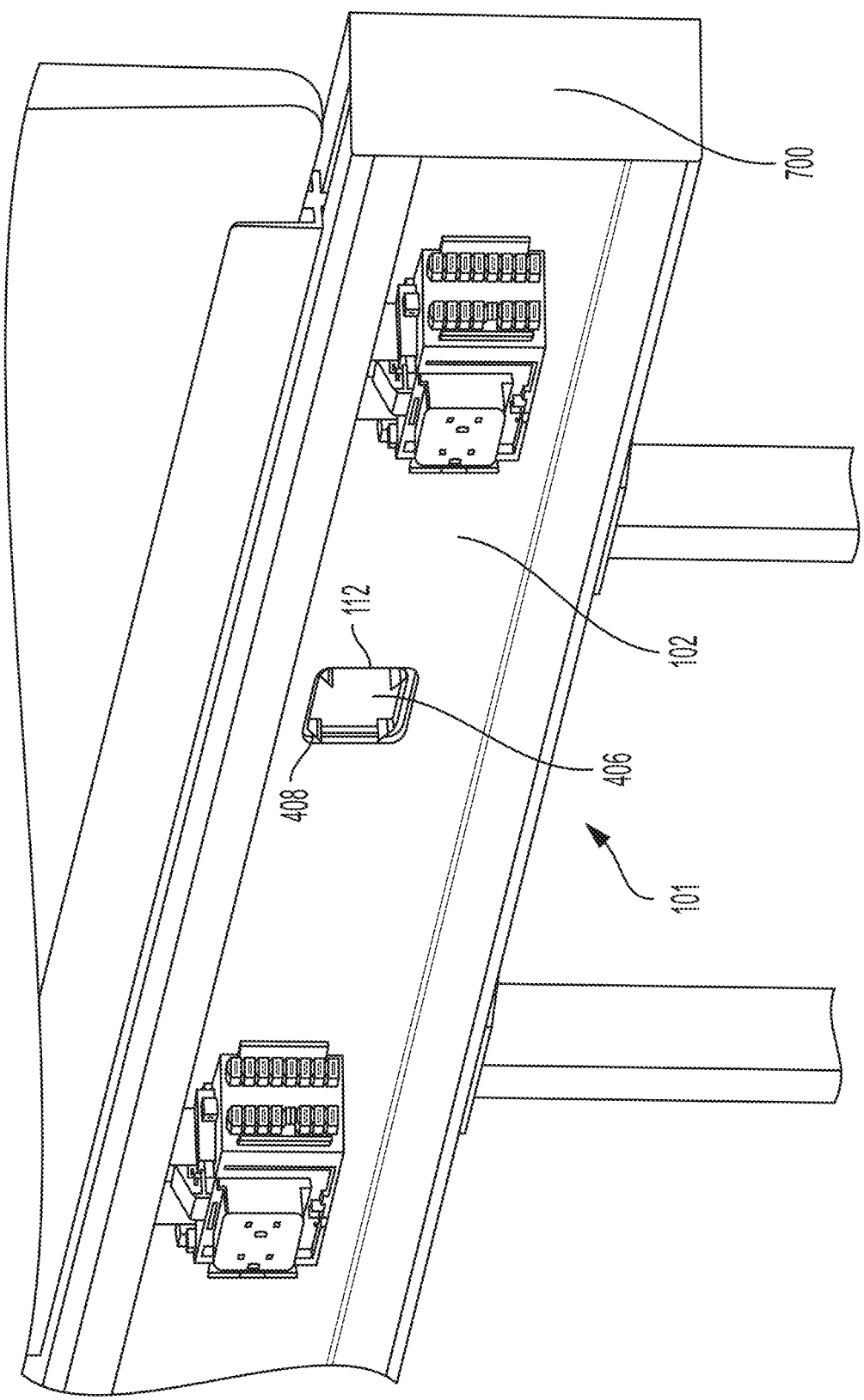
FIG. 18 illustrates a perspective view of a power rail assembly comprising an opening cover, in accordance with at least one aspect of the present disclosure.

The power rail system can further include opening covers 406 that are configured to engage with the cover openings 404 and/or the member openings 112. The opening covers 406 can be utilized to conceal any openings 112, 404 that are unused (e.g., not occupied by a power outlet 801). In one aspect, each opening cover 406 can include snap features 408 positioned to engage with the perimeter of the openings 112, 404 to removably attach the opening cover 406 to the upright wall 102 of the member 200 or the cover 400, as illustrated in FIG. 18.

The power rail system can further include end caps 700 that are configured to engage with the open ends of a power rail assembly 101 (with or without a cover 400 attached thereto). According to various aspects, the end cap 700 can be constructed from silicone or similar flexible materials. As shown in FIG. 19, according to various aspects, the end cap 700 can be symmetrical about axis 3-3 and axis 4-4. The end cap 700 can further include protrusions 702 positioned, sized, oriented, and/or otherwise configured to engage with (e.g., interferingly fit into) the channels 202 of the power rail assembly 101 to removably attach the end cap 700 thereto. In one aspect, the longitudinal slot 208 may further comprise a lobed profile 210. Such a lobed profile 210 is configured to enable the attachment of various compatible third-party accessories to each longitudinal slot 208.

In sum, the power rail system can be assembled in a highly flexible and customizable manner. For example, the longitudinal slot 208, the threaded slot 204, and other such attachment components of the power rail assembly 101 enable flexible placement of legs 600, privacy screens 500, electrical outlet assemblies 800, and other components/accessories. Further, two or more power rail assemblies 101 may be joined together to customize the length or configuration of the power rail system. Still further, any number of legs 600 may be attached to the power rail assembly 101 at various positions along the length of the power rail assembly 101. Still further, the number and placement of the electrical outlet assemblies 800 within the power rail assembly 101 are fully customizable according to the number and configuration of power outlets 801 required for the particular application of the power rail system.

Various aspects of the subject matter described herein are set out in the following numbered examples:

Example 1. A power rail system comprising: a first rail assembly configured to be connected to a second rail assembly by a connector member, the first rail assembly comprising: a sidewall; a first interior compartment at least partially enclosed by the sidewall, the first interior compartment extending longitudinally along the first rail assembly; an opening in communication with the first interior compartment, the opening positioned along the sidewall; and a second interior compartment at least partially enclosed by the sidewall, the second interior compartment extending longitudinally along the first rail assembly and configured to receive the connector member therein; an electrical outlet assembly configured to be disposed at least partially within the first interior compartment, the electrical outlet assembly comprising an electrical outlet configured to be received through the opening such that a face of the electrical outlet is uncovered by the first rail assembly.

Example 2. The power rail system of Example 1, further comprising the second rail assembly and the connector member, the second rail assembly comprising: a second sidewall; a third interior compartment at least partially enclosed by the sidewall, the third interior compartment extending longitudinally along the second rail assembly; a second opening in communication with the third interior compartment, the second opening positioned along the second sidewall; and a fourth interior compartment at least partially enclosed by the second sidewall, the second interior compartment extending longitudinally along the second rail assembly; wherein the connector member is positioned with both the second interior compartment and the fourth interior compartment to removably secure the first rail assembly and the second rail assembly together.

Example 3. The power rail system of Example 2, wherein the connector member is secured within each of the second interior compartment and the fourth interior compartment via fasteners.

Example 4. The power rail system of Example 2 or 3, wherein the first rail assembly comprises a first length and the second rail assembly comprises a second length.

Example 5. The power rail system of any one of Examples 1-4, further comprising a leg configured to be removably connected to the first rail assembly.

Example 6. The power rail system of Example 5, further comprising: a slot extending longitudinally along the first rail assembly; wherein the leg is attachable to the slot via a mounting bracket.

Example 7. The power rail system of any one of Examples 1-6, further comprising a privacy screen configured to be removably connected to the first rail assembly.

Example 8. The power rail system of Example 7, further comprising: a slot extending longitudinally along the first rail assembly; a privacy screen connector configured to removably receive the privacy screen; wherein the privacy screen connector is attachable to the slot via a mounting bracket.

Example 9. The power rail system of any one of Examples 1-8, further comprising: a threaded slot extending longitudinally along the first rail assembly; wherein the electrical outlet assembly is connectable at either a first location or a second location of the threaded slot to secure the electrical outlet assembly within the first interior compartment.

Example 10. The power rail system of any one of Examples 1-9, wherein: the electrical outlet comprises a first electrical outlet; the electrical outlet assembly further comprises a second electrical outlet; and the second electrical outlet is oriented oppositely with respect to the first electrical outlet.

Example 11. The power rail system of Example 10, wherein the opening comprises a first opening and the face comprises a first face, the power rail system further comprising: a cover configured to be removably connected to the first rail assembly, the cover comprising a second opening configured to receive the second electrical outlet therethrough such that a second face of the second electrical outlet is uncovered by the cover.

While various details have been set forth in the foregoing description, it will be appreciated that the various aspects of the techniques may be practiced without these specific details. One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Further, while several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

While particular aspects of the present disclosure have been shown and described, it will be apparent to those skilled in the art that, based upon the teachings herein, changes and modifications may be made without departing from the subject matter described herein and its broader aspects, and, therefore, the appended claims are to encompass within their scope all such changes and modifications as are within the true scope of the subject matter described herein. It will be understood by those skilled in the art that, in general, terms used herein, and especially in the appended claims (e.g., bodies of the appended claims), are generally intended as "open" terms (e.g., the term "including" should be interpreted as "including but not limited to," the term "having" should be interpreted as "having at least," the term "includes" should be interpreted as "includes but is not limited to"). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together). In those instances where a convention analogous to "at least one of A, B, or C, etc." is used, in general, such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

It is worthy to note that any reference to "one aspect," "an aspect," "one form," or "a form" means that a particular feature, structure, or characteristic described in connection with the aspect is included in at least one aspect. Thus, appearances of the phrases "in one aspect," "in an aspect," "in one form," or "in a form" in various places throughout the specification are not necessarily all referring to the same aspect. Furthermore, the particular features, structures, or characteristics may be combined in any suitable manner in one or more aspects.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It should further be appreciated that, for convenience and clarity, spatial terms such as "upper," "lower," "lateral," "proximal," "distal," and so on may be used herein with respect to the drawings. However, these terms are not intended to limit the use of the structures described herein to any particular orientation, and thus, these terms are not intended to be limiting and/or absolute.

In summary, numerous benefits have been described that result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A power rail system comprising:
   a first rail assembly configured to be connected to a second rail assembly by a connector member, the first rail assembly comprising:
   a sidewall;
   a first interior compartment at least partially enclosed by the sidewall, the first interior compartment extending longitudinally along the first rail assembly;
   a first opening in communication with the first interior compartment, the first opening positioned along the sidewall; and
   a second interior compartment, the second interior compartment extending longitudinally along the first rail assembly and configured to receive the connector member therein;
   a cover configured to be removably connected to the first rail assembly to at least partially enclose the first interior compartment, the cover comprising a second opening;
   an electrical outlet assembly configured to be disposed at least partially within the first interior compartment between the sidewall and the cover, the electrical outlet assembly comprising:
   a first electrical outlet comprising a first face;

a second electrical outlet comprising a second face oriented oppositely to the first face;

the electrical outlet assembly configured to be received through the first opening and the second opening such that first face is uncovered by the sidewall and the second face is uncovered by the cover, wherein the electrical outlet assembly is accessible from both sides of the power rail system.

2. The power rail system of claim 1, further comprising the second rail assembly and the connector member, the second rail assembly comprising:

a second sidewall;

a third interior compartment at least partially enclosed by the second sidewall, the third interior compartment extending longitudinally along the second rail assembly;

a second opening in communication with the third interior compartment, the second opening positioned along the second sidewall; and a fourth interior compartment at least partially enclosed by the second sidewall, the second interior compartment extending longitudinally along the second rail assembly;

wherein the connector member is positioned with both the second interior compartment and the fourth interior compartment to removably secure the first rail assembly and the second rail assembly together.

3. The power rail system of claim 2, wherein the connector member is secured within each of the second interior compartment and the fourth interior compartment via fasteners.

4. The power rail system of claim 2, wherein the first rail assembly comprises a first length and the second rail assembly comprises a second length.

5. The power rail system of claim 1, further comprising a leg configured to be removably connected to the first rail assembly.

6. The power rail system of claim 5, further comprising:

a slot extending longitudinally along the first rail assembly;

wherein the leg is attachable to the slot via a mounting bracket.

7. The power rail system of claim 1, further comprising a privacy screen configured to be removably connected to the first rail assembly.

8. The power rail system of claim 7, further comprising:

a slot extending longitudinally along the first rail assembly;

a privacy screen connector configured to removably receive the privacy screen;

wherein the privacy screen connector is attachable to the slot via a mounting bracket.

9. The power rail system of claim 1, further comprising:

a threaded slot extending longitudinally within the first interior component along the first rail assembly;

wherein the electrical outlet assembly is connectable at multiple locations longitudinally along the threaded slot to secure the electrical outlet assembly within the first interior compartment.

10. The power rail system of claim 1, wherein the first rail assembly further comprises:

a first wall extending from the sidewall;

a second wall extending from the sidewall;

wherein the first wall, the second wall, and the sidewall form a C-shaped, open-faced profile around the first interior compartment.

11. The power rail system of claim 1, wherein the first rail assembly comprises an extruded C-shaped member.

* * * * *